US006921257B2

(12) United States Patent
Olaru

(10) Patent No.: US 6,921,257 B2
(45) Date of Patent: Jul. 26, 2005

(54) TIP ASSEMBLY HAVING AT LEAST THREE COMPONENTS FOR HOT RUNNER NOZZLE

(75) Inventor: George Olaru, Toronto (CA)

(73) Assignee: Mold-Masters Limited (CA)

( * ) Notice: Subject to any disclaimer, the term of this patent is extended or adjusted under 35 U.S.C. 154(b) by 0 days.

(21) Appl. No.: 10/262,982

(22) Filed: Oct. 3, 2002

(65) Prior Publication Data

US 2003/0086997 A1 May 8, 2003

Related U.S. Application Data

(60) Provisional application No. 60/356,170, filed on Feb. 14, 2002, provisional application No. 60/346,632, filed on Jan. 10, 2002, and provisional application No. 60/330,540, filed on Oct. 24, 2001.

(30) Foreign Application Priority Data

Oct. 3, 2001 (CA) ............................................. 2358148

(51) Int. Cl.⁷ ............................................. B29C 45/20
(52) U.S. Cl. ................................... 425/549; 264/328.15
(58) Field of Search ...................... 425/549; 264/328.15

(56) References Cited

U.S. PATENT DOCUMENTS

| | | |
|---|---|---|
| 3,677,682 A | 7/1972 | Putkowski |
| 4,013,393 A | 3/1977 | Gellert |
| 4,043,740 A | 8/1977 | Gellert |
| 4,053,271 A | 10/1977 | Gellert |
| 4,173,448 A | 11/1979 | Rees et al. |
| 4,268,240 A | 5/1981 | Rees et al. |
| 4,279,588 A | 7/1981 | Gellert |
| 4,286,941 A | 9/1981 | Gellert |
| 4,312,630 A | 1/1982 | Travaglini |
| 4,517,453 A | 5/1985 | Tsutsumi |
| 4,652,230 A | 3/1987 | Osuna-Diaz |
| 4,662,837 A | 5/1987 | Anderson |
| 4,787,836 A | 11/1988 | Osuna-Diaz et al. |
| 4,950,154 A | 8/1990 | Moberg |

(Continued)

FOREIGN PATENT DOCUMENTS

| | | |
|---|---|---|
| DE | 100 08 722 A1 | 8/2001 |
| DE | 10037739 A1 | 2/2002 |
| EP | 0 743 158 A1 | 11/1996 |

(Continued)

OTHER PUBLICATIONS

Redacted letter and attached figure addressed to Mold Masters Limited from the representative of Mr. Maurizio Bazzo dated Dec. 21, 2001.

(Continued)

*Primary Examiner*—Tim Heitbrink
(74) *Attorney, Agent, or Firm*—Sterne, Kessler, Goldstein & Fox P.L.L.C.

(57) ABSTRACT

A nozzle for an injection molding apparatus is provided. The injection molding apparatus has a mold component that defines a mold cavity and a gate into the mold cavity. The nozzle includes a nozzle body, a heater, a tip, a tip surrounding piece and a mold component contacting piece. The nozzle body defines a nozzle body melt passage therethrough, that is adapted to receive melt from a melt source. The heater is thermally connected to the nozzle body for heating melt in the nozzle body. The tip defines a tip melt passage therethrough, that is downstream from the nozzle body melt passage, and that is adapted to be upstream from the gate. The tip surrounding piece is removably connected with respect to said nozzle body. The mold component contacting piece is connected with respect to the nozzle body. The material of the mold component contacting piece has a thermal conductivity that is less than at least one of the thermal conductivity of the material of the tip and the thermal conductivity of the material of the tip surrounding piece.

36 Claims, 17 Drawing Sheets

U.S. PATENT DOCUMENTS

| | | | |
|---|---|---|---|
| 5,028,227 A | | 7/1991 | Gellert et al. |
| 5,030,084 A | | 7/1991 | Gellert et al. |
| 5,208,052 A | | 5/1993 | Schmidt et al. |
| 5,268,184 A | | 12/1993 | Gellert |
| 5,269,677 A | | 12/1993 | Gauler |
| 5,299,928 A | | 4/1994 | Gellert |
| 5,324,191 A | | 6/1994 | Schmidt |
| 5,360,333 A | * | 11/1994 | Schmidt ..................... 425/549 |
| 5,374,182 A | | 12/1994 | Gessner |
| 5,421,716 A | | 6/1995 | Gellert |
| 5,474,439 A | | 12/1995 | McGrevy |
| 5,492,467 A | | 2/1996 | Hume et al. |
| 5,545,028 A | | 8/1996 | Hume et al. |
| 5,554,395 A | | 9/1996 | Hume et al. |
| 5,569,475 A | | 10/1996 | Adas et al. |
| 5,658,604 A | | 8/1997 | Gellert et al. |
| 5,674,439 A | | 10/1997 | Hume et al. |
| 5,736,171 A | | 4/1998 | McGrevy |
| 5,795,599 A | | 8/1998 | Gellert |
| 5,804,228 A | | 9/1998 | Kofsman et al. |
| 5,811,140 A | | 9/1998 | Manner |
| 5,871,786 A | | 2/1999 | Hume et al. |
| 5,879,727 A | * | 3/1999 | Puri ........................... 425/549 |
| 5,885,628 A | | 3/1999 | Swenson et al. |
| 5,894,025 A | | 4/1999 | Lee et al. |
| 5,925,386 A | | 7/1999 | Moberg |
| 5,980,234 A | | 11/1999 | Harley |
| 5,980,237 A | | 11/1999 | Swenson et al. |
| 6,022,210 A | | 2/2000 | Gunther |
| 6,074,195 A | | 6/2000 | Belous |
| 6,164,954 A | | 12/2000 | Mortazavi et al. |
| 6,208,052 B1 | | 3/2001 | Kershaw et al. |
| 6,227,461 B1 | | 5/2001 | Schroeder et al. |
| 6,245,278 B1 | | 6/2001 | Lausenhammer et al. |
| 6,254,377 B1 | | 7/2001 | Kazmer et al. |
| 6,261,084 B1 | | 7/2001 | Schmidt |
| 6,264,460 B1 | | 7/2001 | Wright et al. |
| 6,309,208 B1 | | 10/2001 | Kazmer et al. |
| 6,315,549 B1 | | 11/2001 | Jenko et al. |
| 6,394,785 B1 | | 5/2002 | Ciccone |
| 6,428,305 B2 | | 8/2002 | Jenko |
| 6,533,571 B2 | | 3/2003 | Fikani |
| 6,609,902 B1 | | 8/2003 | Blais et al. |
| 6,726,467 B1 | | 4/2004 | Lefebure |
| 2001/0033044 A1 | | 10/2001 | Fikani |
| 2003/0082264 A1 | | 5/2003 | Babin et al. |
| 2003/0082266 A1 | | 5/2003 | Babin et al. |
| 2003/0118688 A1 | | 6/2003 | Bazzo et al. |
| 2003/0170340 A1 | | 9/2003 | Sicilia et al. |
| 2003/0211199 A1 | | 11/2003 | Eigler et al. |
| 2003/0235638 A1 | | 12/2003 | Gellert |

FOREIGN PATENT DOCUMENTS

| | | |
|---|---|---|
| EP | 0835176 B1 | 4/1998 |
| EP | 0 743 158 B1 | 8/1999 |
| EP | 0 920 969 A1 | 9/1999 |
| EP | 1 321 274 A1 | 6/2003 |
| JP | 10 034708 | 2/1998 |
| WO | WO 97/02129 | 1/1997 |
| WO | WO/00/48814 | 8/2000 |
| WO | WO 01/28750 A1 | 10/2000 |
| WO | WO 01/78961 | 10/2001 |
| WO | WO 03/028974 | 4/2003 |
| WO | WO 03/086734 | 10/2003 |

OTHER PUBLICATIONS

Ewikon, HPS III–VT Nozzles, 230 V Externally Heated, "For Multi–Cavity Applications and Close Cavity Spacing", pp. 2–7, Oct. 2001.

Ewikon, HPS III Single Tips, 230 V Externally Heated, "HPS III–SE High Performance Single Tips, 230 V With Tip Sealing Technology", pp. 2–9, Mar. 2002.

Ewikon, Product Guide, "Internally Heated Hotrunner Systems", pp. 2–7, Oct. 2000.

Ewikon, HPS III–NV Valve Gate Systems, All Advantages of the Valve Gate Technology in a Most Compact System, pp. 2–9, Oct. 2001.

Ewikon, Instruction Manual for Ewikon Hotrunner Systems.

Ewikon, Hotrunner Systems for the Packaging and Medical Industry, pp. 2–7, Jun. 2001.

Ewikon, Hotrunner Systems for Large Parts, pp. 2–11, May 2000.

Daniel Frenkler and Henryk Zawistowski—RAPRA Technology Ltd., "Hot Runners in Injection Moulds", 2001.

Husky Injection Molding Systems, S.A, 750 Series.

* cited by examiner

TIP ASSEMBLY HAVING AT LEAST THREE COMPONENTS FOR HOT RUNNER NOZZLE

CROSS-REFERENCE TO RELATED APPLICATIONS

This application claims the benefit of U.S. Provisional Application No. 60/330,540, filed Oct. 24, 2001, U.S. Provisional Application No. 60/346,632, filed Jan. 10, 2002, and U.S. Provisional Application No. 60/356,170, filed Feb. 14, 2002.

FIELD OF THE INVENTION

This invention relates to an injection molding apparatus, and more particularly to a tip assembly having at least three components for a nozzle for an injection molding apparatus.

BACKGROUND OF THE INVENTION

It is known for a nozzle in hot runner injection molding apparatus to include a thermally conductive body and a thermally conductive tip. Furthermore, it is known for the nozzle to include a separate piece that joins to the nozzle body and retains the tip in place in the nozzle body. The tip surrounding piece is also typically used to form a seal surrounding the space between the nozzle and the mold component to which the nozzle transfers melt. Because the mold component is usually maintained at a different temperature than the tip at least for a portion of an injection molding cycle, the tip surrounding piece is typically made from a material that is less thermally conductive than the tip itself.

An example of such a nozzle construction is shown in U.S. Pat. No. 5,299,928 (Gellert). A problem with such nozzle constructions, however, is that the tip surrounding piece, which has a lower thermally conductive material than the tip, can impede heat transfer from a heater on the nozzle, to melt that is in the tip.

Thus, a need exists for new nozzle and molding apparatus constructions that have improved heat transfer efficiency.

SUMMARY OF THE INVENTION

In a first aspect, the present invention is directed to a nozzle for an injection molding apparatus. The injection molding apparatus has a mold component that defines a mold cavity and a gate into the mold cavity. The nozzle includes a nozzle body, a heater, a tip, a tip surrounding piece and a mold component contacting piece. The nozzle body defines a nozzle body melt passage therethrough, that is adapted to receive melt from a melt source. The heater is thermally connected to the nozzle body for heating melt in the nozzle body. The tip defines a tip melt passage therethrough, that is downstream from the nozzle body melt passage, and that is adapted to be upstream from the gate. The tip surrounding piece is removably connected with respect to said nozzle body. The mold component contacting piece is connected with respect to the nozzle body. The material of the mold component contacting piece has a thermal conductivity that is less than at least one of the thermal conductivity of the material of the tip and the thermal conductivity of the material of the tip surrounding piece.

In a second aspect, the present invention is directed to an injection molding apparatus that incorporates at least one of the nozzle described above.

DESCRIPTION OF THE DRAWINGS

For a better understanding of the present invention and to show more clearly how it may be carried into effect, reference will now be made by way of example to the accompanying drawings, in which.

DESCRIPTION OF THE PREFERRED EMBODIMENT

Figure 1:
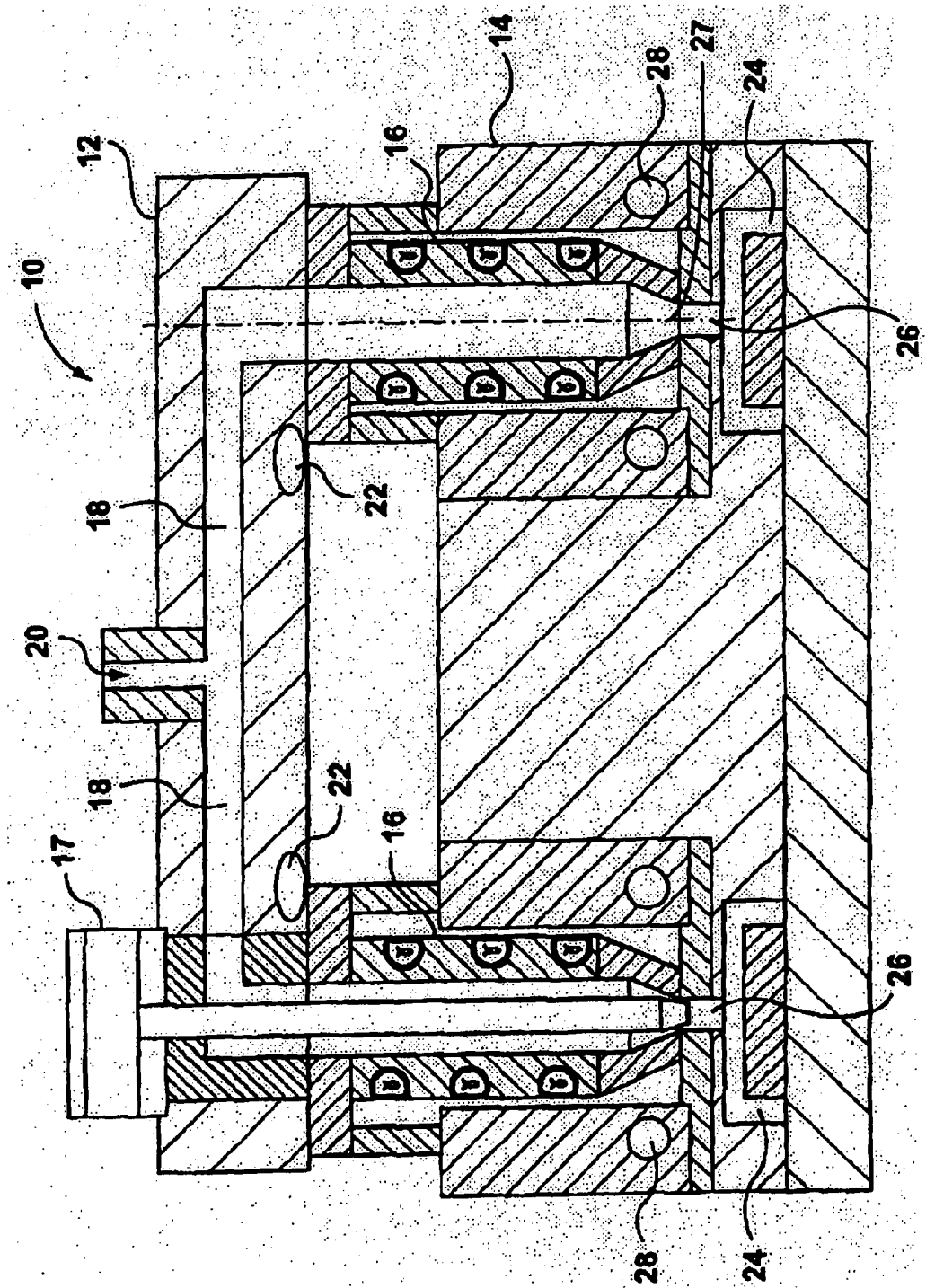
FIG. 1 is a sectional view of an injection molding apparatus having a plurality of nozzles and a mold component in accordance with a first embodiment of the present invention.

Reference is made to FIG. 1, which shows an injection molding apparatus 10, which includes a runner component 12, a mold component 14, a plurality of nozzles 16 in accordance with a first embodiment of the present invention and a plurality of optional valve pin devices 17.

The runner component 12 includes a plurality of runners 18, which transfer melt from a main runner inlet 20 to the nozzles 16. The runner component 12 may be heated by a heater 22.

The mold component 14 is made up of a plurality of mold components, which together define a plurality of mold cavities 24. A gate 26 into each mold cavity 24 is defined in the mold component 14 and has an axis 27. Each gate 26 is positioned downstream from one of the nozzles 16.

A plurality of cooling channels 28 may be included in the mold component 14. The cooling channels 28 transport a cooling fluid throughout the mold component 14 to cool and solidify melt in the mold cavities 24.

Figure 1A:
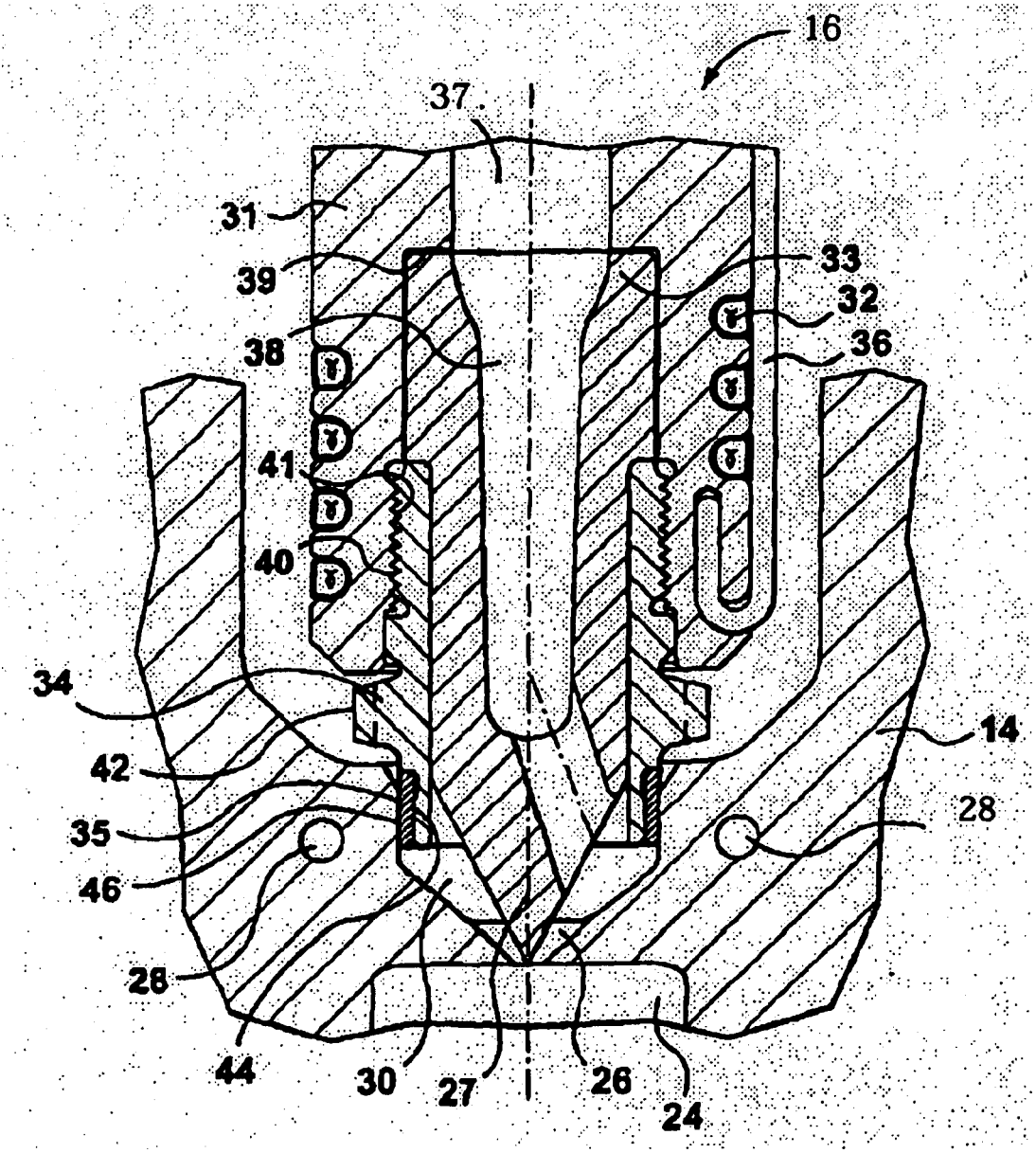
FIG. 1a is a magnified sectional view of a portion of one of the nozzles and the mold component shown in FIG. 1.

Reference is made to FIG. 1a. Each nozzle 14 receives melt from the runner component 12 and transfers the melt into a chamber 30 between the nozzle 16 and the mold component 14, and then through one of the gates 26 and into to one of the mold cavities 24. Each nozzle 16 includes a nozzle body 31, a heater 32, a tip 33, a tip surrounding piece 34 and a mold component contacting piece 35 and may include an optional thermocouple 36.

The nozzle body 31 defines a nozzle body melt passage 37 which receives melt from one of the runners 18. The heater 32 is connected to the nozzle body 31 for heating melt in the nozzle 16. The heater 32 may be any suitable kind of heater, such as a resistive wire heater, or a sleeve heater, as long as it is thermally connected to the nozzle body 31, i.e. the heater 32 is connected such that heat is transferable from the heater 32 to the nozzle body 31. For example, the heater 32 may wrap around the nozzle body 31 in a groove on the outer surface of the nozzle body 31.

The tip 33 defines a tip melt passage 38, and is removably connected to the nozzle body 31 so that the tip melt passage 38 is in fluid communication with and downstream from the nozzle body melt passage 37. The tip melt passage 38 has an exit which is shown at may be offset from axis 27, as shown in FIG. 1a. In this embodiment, the tip 33 extends into the gate 26, to heat melt passing through the gate 26.

The tip 33, and more particularly the tip melt passage 38, transports the melt from the body melt passage 37 to chamber 30. The tip 33 is made from a first material that is preferably thermally conductive to reduce losses in the heat transferred from the heater 32 to the melt in the tip melt passage 38. Some examples of suitable first materials for the tip 33 are Be—Cu(Beryllium-Copper), Beryllium-free Copper, such as AMPCO 940, TZM (Titanium/Zirconium carbide), Aluminum or Aluminum-based alloys, Nickel-Chromium alloys, such as INCONEL, Molybdenum or suitable Molybdenum alloys, H13, mold steel or steel alloys, such as AERMET 100.

Also, however, because of the melt flow through tip 33, the tip 33 may be exposed to a highly abrasive environment, and may be made from a wear resistant first material. An example of such a first material that is both thermally conductive and wear resistant is Tungsten Carbide. U.S. Pat. No. 5,658,604 (Gellert et al.) discloses the construction of a nozzle tip using Tungsten Carbide. The tip 33 may be made using the construction taught in U.S. Pat. No. 5,658,604.

The tip 33 may be removable from the body 31. The tip 33 may, for example, seat against a shoulder 39 in the body 31. The shoulder 39 may be an internal shoulder, as shown in FIG. 1a, or alternatively, it may be on the exterior of body 31.

The tip surrounding piece 34 may retain the tip 33 in place on the nozzle body 31. The tip surrounding piece 34 may be removably connected to the nozzle body 31. For example, tip surrounding piece 34 may include a tip surrounding piece threaded portion 40, which mates with a corresponding nozzle body threaded portion 41 on the nozzle body 31. In the present embodiment, shown in FIG. 1a, threaded portion 40 is shown to have external threads, and threaded portion 41 is shown to have internal threads. Alternatively, however, threaded portion 40 may have internal threads and may mount to a corresponding externally threaded portion 41 in the nozzle body 31. Such a mounting is taught in U.S. Pat. No. 5,208,052, which is hereby incorporated by reference. As a further alternative, the threaded portions 40 and 41 may be replaced by any other suitable removable connecting means for connecting the tip surrounding piece 34 to the nozzle body 31 to retain the tip 33 in place.

For some users, for example, users who mold several different types of articles from a variety of different materials, it may be desirable to have several different types of tips 16 available for use in the nozzles of their injection molding apparatus. A user may, for example, have many different sets of tips 16 for use with their injection molding apparatus, each set of tips 16 being suited to one or more molding applications. Rather than machining threaded portion 40 on each set of tips 16, the tips 16 may be free of threads or other connecting means, and the tip surrounding piece 34 can include the connecting means, such as threads 40, as shown in FIG. 1a. A single tip surrounding piece 34 can be configured to retain all the different types of tip 33. This eliminates the need to manufacture a connecting means, such as a threaded portion, on each set of tips 16. Furthermore, depending on the characteristics of the molding application, the tips 16 may wear and may require regular replacement. By eliminating the need to include threads on the tips 16, the cost of replacement sets of tips 16 can be reduced.

The tip surrounding piece 34 is made from a second material that may be less wear resistant than the first material from which the tip 33 is made, because the tip surrounding piece 34 does not have an internal melt passage. Accordingly, the tip surrounding piece 34 may be made from a second material that is relatively easily machined with threaded portion 40.

The tip surrounding piece 34 may also include a gripping portion 42 to facilitate the removal of the tip surrounding piece 34 from the nozzle body 31. The gripping portion 42 may be, for example, hexagonal for receiving a removal tool (not shown), such as a wrench.

The tip surrounding piece 34 and the tip 33 may be two separate, distinct pieces, as shown in the Figures. However, it can sometimes be difficult to remove the tip 33 from the nozzle body 31 due, for example, to a buildup of plastic between their mating surfaces. To facilitate the removal of the tip 33 from the nozzle body 31, the tip surrounding piece 34 and the tip 33 may alternatively be brazed or otherwise joined together, rather than being separate.

The tip surrounding piece 34 is at least in part, positioned between the tip melt passage 38 and the heater 32 along at least a portion of the length of the tip melt passage 38. In order to improve the heat flow from the heater to the tip melt passage 38, the tip surrounding piece 34 may be made from a thermally conductive second material. However, as explained above, the tip surrounding piece 34 is not necessarily made from a wear resistant second material. The tip surrounding piece 34 may be made from such second materials as, Copper, Be—Cu (Beryllium-Copper), Beryllium-free Copper, such as, AMPCO 940, TZM (Titanium/Zirconium carbide), Aluminum or Aluminum-based alloys, Nickel-Chromium alloys, such as INCONEL, Molybdenum or suitable Molybdenum alloys, H13, steel, mold steel or steel alloys, such as AERMET 100.

The mold component contacting piece 35 contacts the mold component 14, and may inhibit melt leakage out of the chamber formed between the nozzle 16 and the mold component 14. The mold component contacting piece 35 may, for example, be positioned between the tip surrounding piece 34 and the mold component 14, as shown in FIG. 1a. The mold component contacting piece 35 may form a first seal 44 with at least one of the tip surrounding piece 34 (as shown in FIG. 1a), the tip 33, the nozzle body 31 or some other portion of the nozzle 16, and forms a second seal 46 with the mold component 14.

The mold component contacting piece 35 may align nozzle 16 with respect to the gate 26. The alignment means may be provided by the same surfaces that provide the seals 44 and 46. For example, seals 44 and 46 may be mechanical seals, formed by a close fit between mold component contacting piece 35 and the bore 48 and between the mold component contacting piece 35 and the tip surrounding piece 34, thereby aligning the nozzle 16 with respect to the gate 26. Alternatively, a separate alignment means may be used to position nozzle 16 with respect to the gate 26.

The mold component contacting piece 35 may be positioned outside of the path between the melt passage 38 and the heater 32. The mold component contacting piece 35 may instead be positioned between the mold component 14 and at least one of the tip surrounding piece 34, the tip 33 and the nozzle body 31. Typically, at least for some portion of an injection molding cycle, the mold component 14 and the nozzle 16 are maintained at different temperatures. For example, once the mold cavity 24 is filled with melt, the mold component 14 may be cooled to cause solidification of the melt in the mold cavity 24. However, the nozzle 16 may be heated to keep the melt contained therein hot and ready for the next injection phase. In order to reduce unwanted heat transfer between the nozzle 16 and the mold component 14, the mold component contacting piece 35 may be made from a material that is comparatively less thermally conductive than the material of the nozzle tip 33. Furthermore, the material of the mold component contacting piece 35 may be less thermally conductive than the material of the tip surrounding piece 34. For example, the mold component contacting piece 35 may be made from titanium, H13, stainless steel, mold steel or chrome steel. Other alternative materials include ceramics and plastics. Other suitable materials for the mold component contacting piece 35 are disclosed in U.S. Pat. No. 5,879,727 (Puri), which is hereby incorporated by reference. Puri discloses such materials for use as an insulative layer for a nozzle.

The mold component contacting piece 35 may be a separate piece that is mechanically joined to tip surrounding piece 34 by a suitable joint, such as an interference fit, as shown. Alternatively, the mold component contacting piece 35 may be made by spraying a coating onto the tip surrounding piece 34, and then machining the coating as required, to a suitable dimension for mating and sealing appropriately with the mold component 14. U.S. Pat. No. 5,569,475 (Adas et al.) discloses a method of spraying on an insulating layer onto a portion of a nozzle, and is hereby incorporated by reference.

Figure 1B:
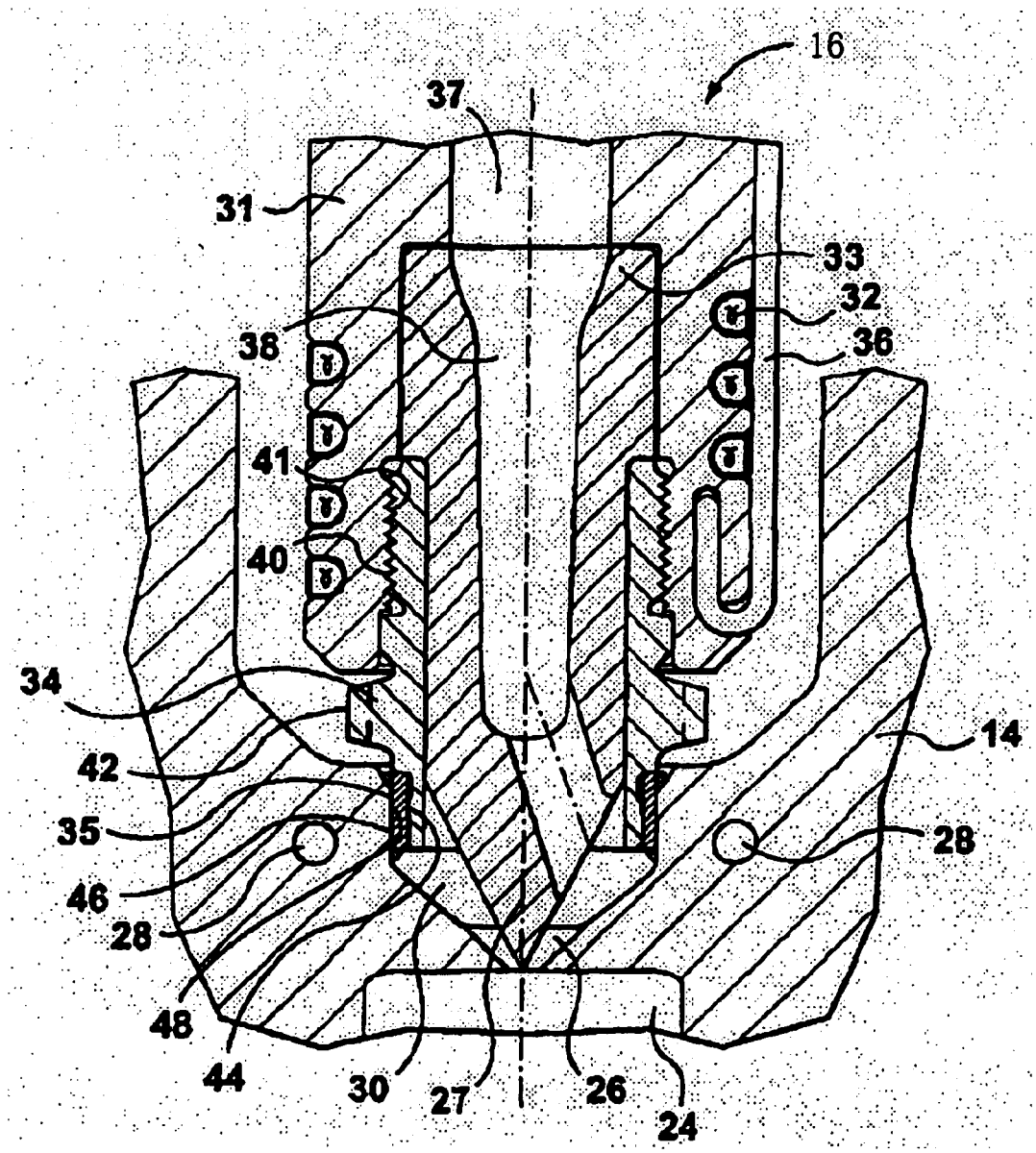
FIG. 1b is a magnified section view of a portion of a nozzle and a mold component, in accordance with a variant of the first embodiment of the present invention.

The mold component contacting piece 35 may be joined to the tip surrounding piece 34, as shown in FIG. 1a. Alternatively, the mold component contacting piece 35 may be joined to the mold component 14 and may cooperate with the tip surrounding piece 34 to form a seal therebetween when the nozzle 16 and the mold component 14 are assembled together. For example, the mold component contacting piece 35 may be brazed or otherwise joined to the wall of bore 48, as shown in FIG. 1b.

Figure 2:
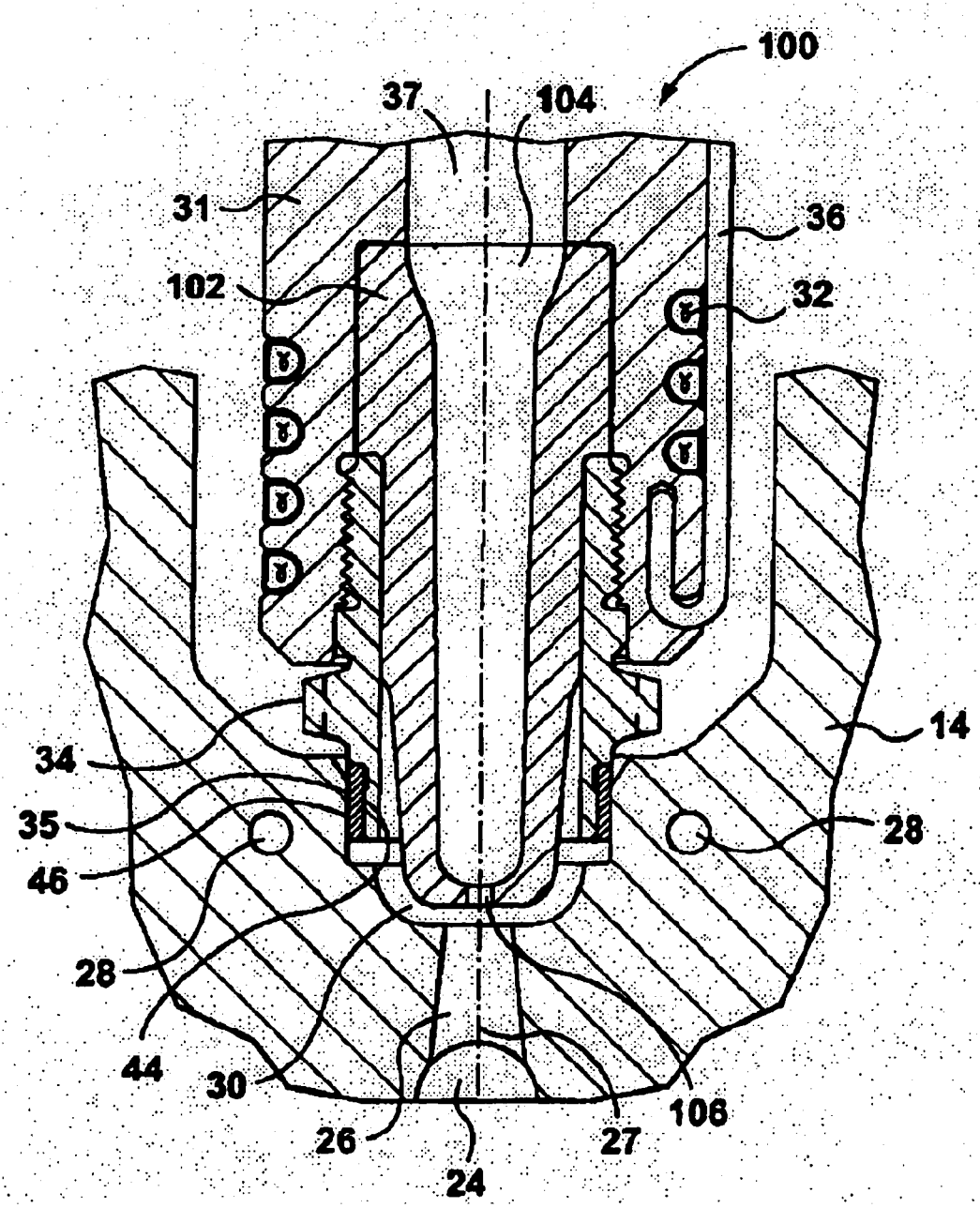
FIG. 2 is a magnified sectional view of a portion of a nozzle and a mold component in accordance with a second embodiment of the present invention.

Reference is made to FIG. 2, which shows a nozzle 100 in accordance with a second embodiment of the present invention, in combination with mold component 14. The nozzle 100 may be similar to the nozzle 16 (FIG. 1a), includes the nozzle body 31, the heater 32, a tip 102, the tip surrounding piece 34 and the mold component contacting piece 35. The tip 102 differs from the tip 33 in that the tip 102 has a melt passage 104 with an exit 106 that is concentric about the axis 27 of the gate 26.

Thus, a nozzle in accordance with the present invention may have a tip that inserts into the gate 26 and has an off-centre melt passage exit (as shown in FIG. 1a), or alternatively the nozzle may a tip that has a melt passage exit that is concentric about the axis 27 of the gate 26 (as shown in FIG. 2).

Figure 3:
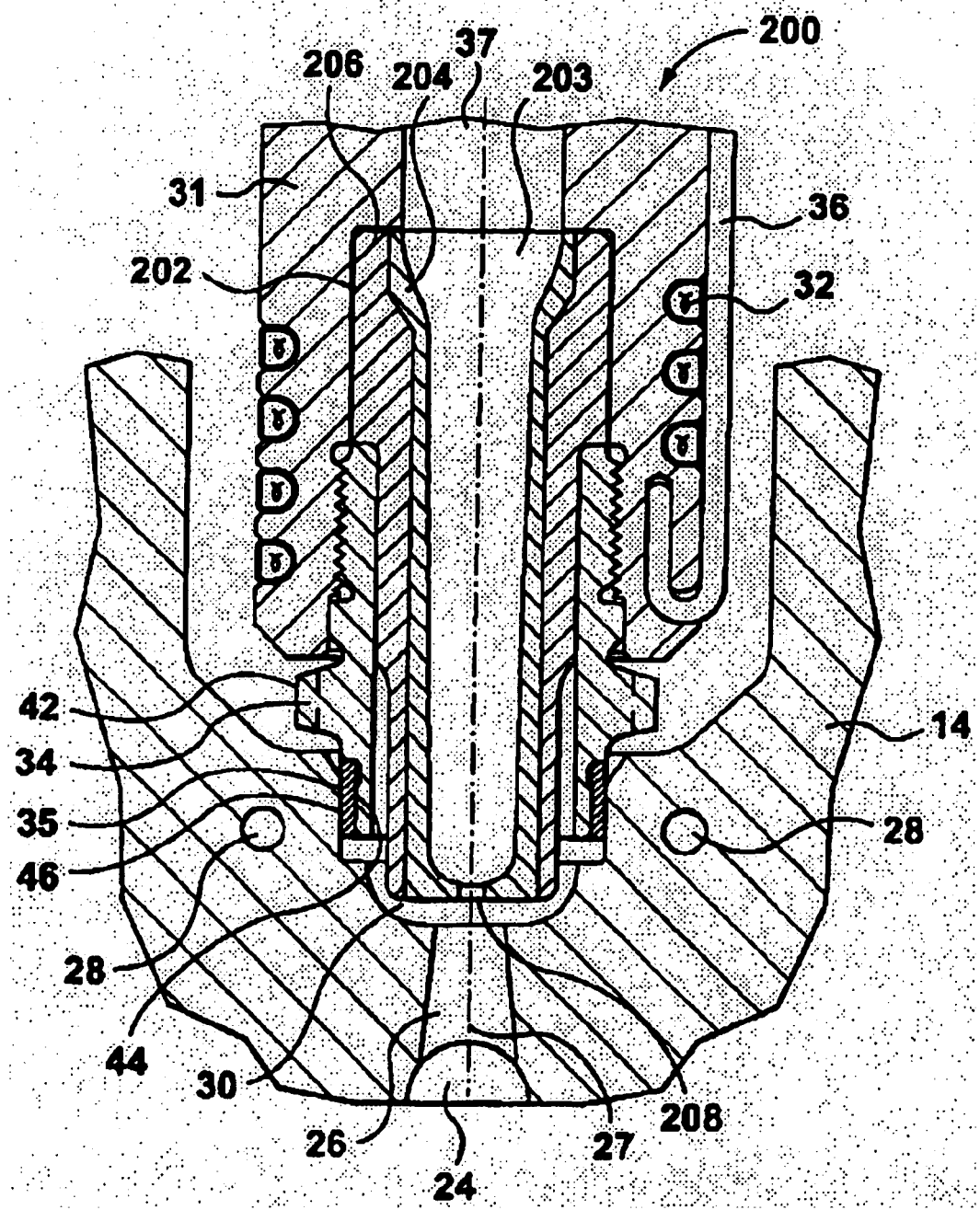
FIG. 3 is a magnified sectional view of a portion of a nozzle and a mold component in accordance with a third embodiment of the present invention

Reference is made to FIG. 3, while shows a nozzle 200 in accordance with a third embodiment of the present invention, in combination with mold component 14. The nozzle 200 may be similar to any of the nozzles described herein, such as the nozzle 100 (FIG. 2). The nozzle 200 includes the nozzle body 31, the heater 34, a two-component tip 202, the tip surrounding piece 34 and the mold component contacting piece 35. The tip 202 may be similar to the tip 102 (FIG. 2) and may define a tip melt passage 203 which is in fluid communication with the body melt passage 37. The tip 202, however, includes an inner portion 204 and an outer portion 206. The inner portion 204 contains the melt passage 102 therethrough. The inner portion 204 may be made from a wear resistant, thermally conductive material. For example, the inner portion 204 may be made from Tungsten Carbide. The outer portion 206 may be made from a thermally conductive material, but may be made from a material that is less wear resistant than the material of the inner portion 206, thus providing greater freedom to select a suitable material for the outer portion 206. For example, the outer portion 206 may be made from a highly thermally conductive material such as Aluminum or an Aluminum alloy, Be—Cu (Beryllium-Copper), or Beryllium-free Copper or TZM (Titanium/Zirconium carbide). It will be appreciated that the inner portion 204 need not be a distinct piece that is joined to the outer portion 206, but may instead be made by applying a suitable coating to the interior wall of the outer portion 206.

The tip melt passage 203, which has an exit 208, which may be concentric about axis 27, as shown in FIG. 3. Alternatively, tip 202 may be of a configuration similar to that of tip 33 (shown in FIG. 1a), and may have an exit that is offset from axis 27.

Figure 4:
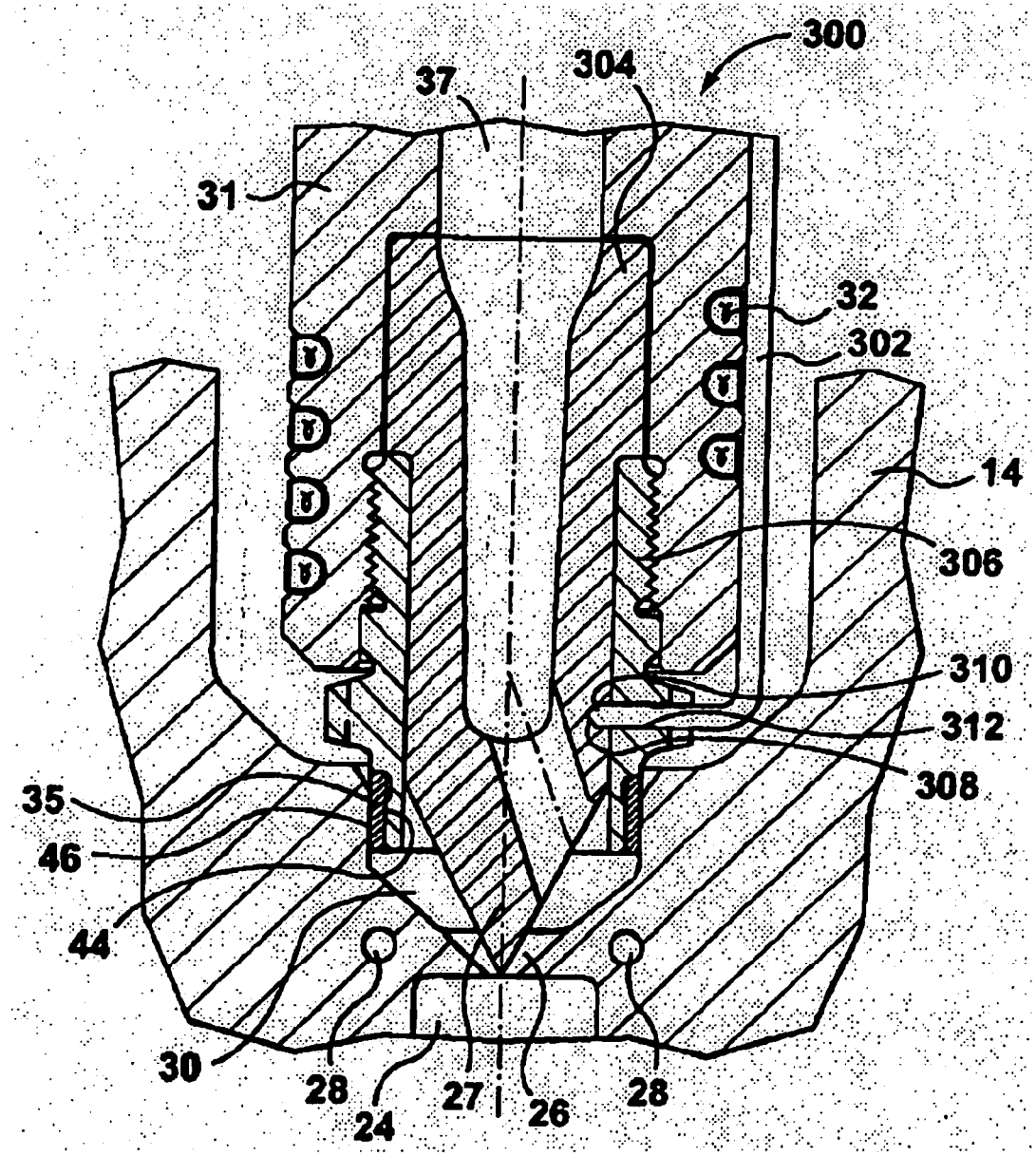
FIG. 4 is a magnified sectional view of a portion of a nozzle and a mold component in accordance with a fourth embodiment of the present invention.

Reference is made to FIG. 4, which shows a nozzle 300 in accordance with a fourth embodiment of the present invention, in combination with the mold component 14. The nozzle 300 may be similar to any of the nozzles described herein, such as the nozzle 10, and may include the nozzle body 31, the heater 34, a thermocouple 302, a tip 304, a tip surrounding piece 306 and the mold component contacting piece 35. The thermocouple 302 penetrates into the tip 304, to get a more accurate temperature for the melt flowing through the tip 304. The tip 304 includes an aperture 308 for receiving the sensing portion of thermocouple 302, which is shown at 310. The aperture 308 may be, for example, a hole sized to snugly receive the sensing portion 310, to improve the sensing of the temperature of the melt. The tip surrounding piece 306 includes a pass-through 312, which may be, for example, a slotted hole, to permit the passage of the sensing portion 308 of the thermocouple 302 into the aperture 308.

Figure 5:
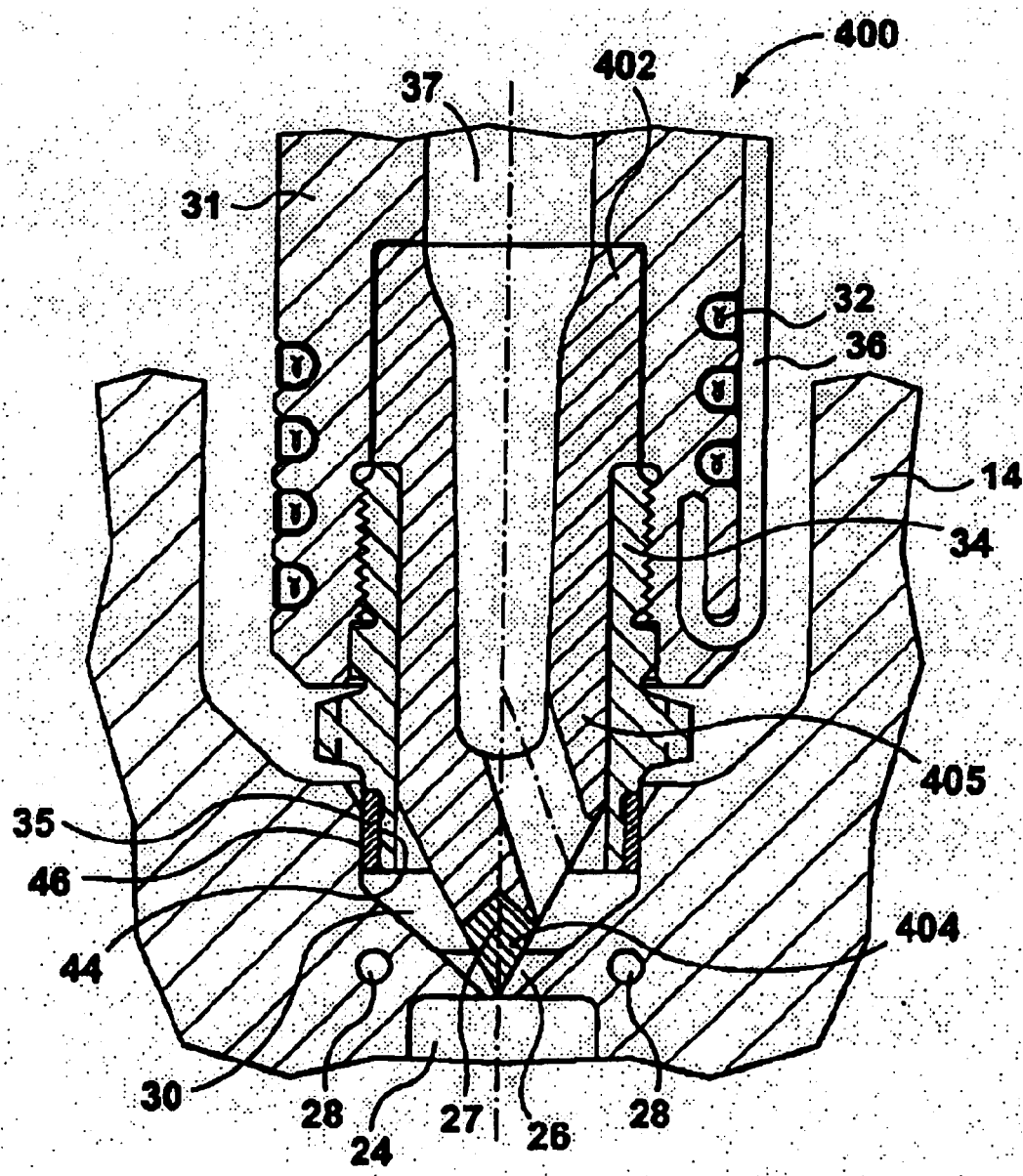
FIG. 5 is a magnified sectional view of a portion of a nozzle and a mold component in accordance with a fifth embodiment of the present invention.

Reference is made to FIG. 5, which shows a nozzle 400, in accordance with a fifth embodiment of the present invention, in combination with mold component 14. The nozzle 400 may be similar to the nozzle 16 (FIG. 1a), and may include the nozzle body 31, the heater 32, a tip 402, the tip surrounding piece 34 and the mold component contacting piece 35. The tip 402 may have a torpedo configuration and may have a downstream end 404 that is generally coned and may extend into the gate 26.

The downstream end 404 is subject to increased wear from the melt flow for several reasons. A first reason is that the available cross-sectional area through which the melt can flow (i.e. the gate area minus the area of the end 404) is relatively small and as a result the melt flow velocity through the gate 26 is relatively high. The higher melt flow velocity increases the wear on the end 404. A second reason is that the end 404 has a relatively high surface-to-volume ratio, relative to other portions of the tip 402 that are exposed to the melt flow, and is therefore, particularly easily damaged by wear from the melt flow.

The end 404 may be made from a wear resistant, thermally conductive material, such as tungsten carbide. The main portion of the tip 402, shown at 405, may be made from a less wear resistant material than the end 404, and may be made from a greater selection of materials. For example, a highly thermally conductive material may be selected for the main portion 405, such as Aluminum, an Aluminum alloy, or Be—Cu (Beryllium-Copper). By making the tip 402 with the compound construction described above, it can be wear resistant in a selected portion, and may be less wear resistant but highly thermally conductive elsewhere. It will be appreciated that the materials for the end 404 and for the main portion 405 may be selected for any desirable characteristics and not only for wear resistance and thermal conductivity. It will also be appreciated that the tip 402 may include one or more other portions having selected properties, instead of, or in addition to the end 404. It will also be appreciated, that the end 404 may be made by heat treating or coating the tip 402.

Figure 6:
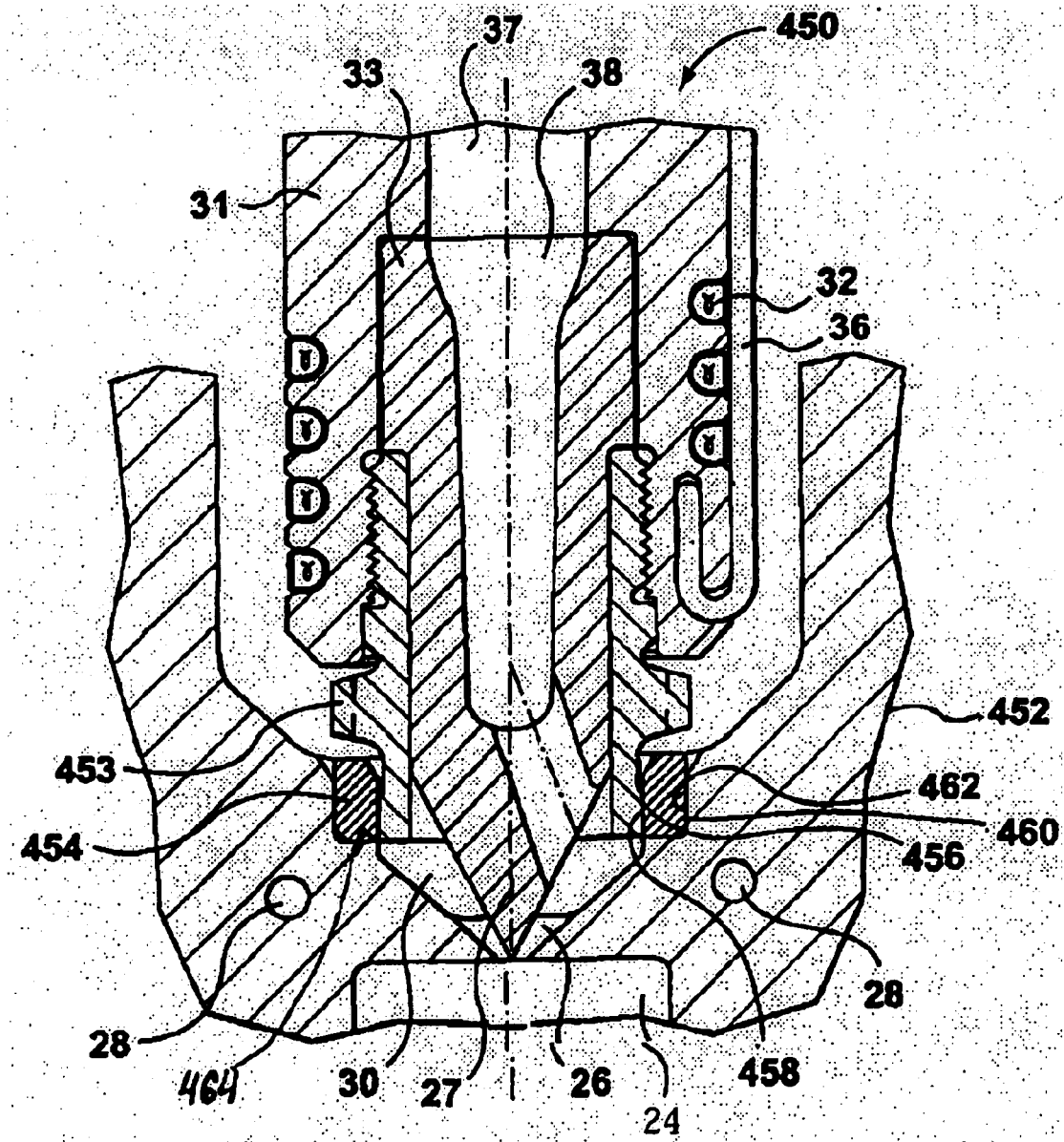
FIG. 6 is a magnified sectional view of a portion of a nozzle and a mold component in accordance with a sixth embodiment of the present invention.

Reference is made to FIG. 6, which shows a nozzle 450 in accordance with a sixth embodiment of the present invention, in combination with a mold component 452. The nozzle 450 may be similar to nozzle 16 (FIG. 1a) and includes the nozzle body 31, the heater 32, the tip 33, a tip surrounding piece 453 and a mold component contacting piece 454, and may include an optional thermocouple 36.

The tip surrounding piece 453 may be similar to the tip surrounding piece 34 (FIG. 1a) and may retain the tip 33 in place in the nozzle body 14. However, the tip surrounding piece 453 has a first sealing surface 456 included thereon, which forms a seal with a second sealing surface 458 positioned on the mold component contacting piece 454. The tip surrounding piece 453 and the mold component contacting piece 454 may not be attached together. The tip surrounding piece 453 may instead seal against the mold component contacting piece 454, while the mold component contacting piece 454 may remain attached to the mold component 452.

Aside from remaining in the mold component 452, the mold component contacting piece 454 may be similar to the mold component contacting piece 35 (FIG. 1a). The mold component contacting piece 454 may further include a third sealing surface 460 for mating with a fourth sealing surface 462 on the mold component 452. The mold component contacting piece 454 may seat against a shoulder 464 on the mold component 452.

Figure 7:
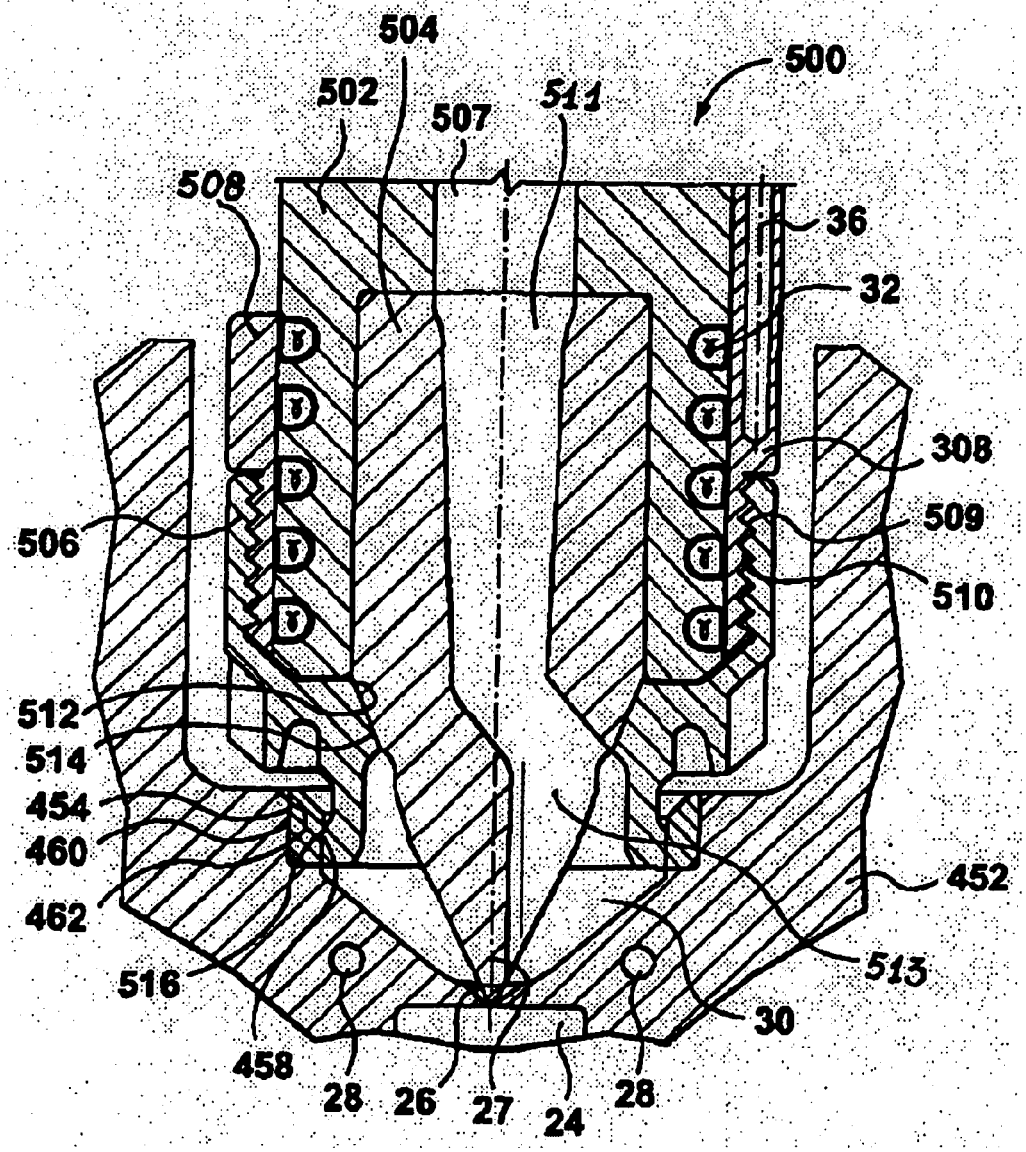
FIG. 7 is a magnified sectional view of a portion of a nozzle and a mold component in accordance with a seventh embodiment of the present invention.

Reference is made to FIG. 7, which shows a nozzle 500 in accordance with a seventh embodiment of the present invention, in combination with the mold component 452.

The nozzle 500 may be similar to the nozzle 16 (FIG. 1a), and may include a nozzle body 502, the heater 32, a tip 504, a tip surrounding piece 506 and the mold component contacting piece 454.

The nozzle body 502 may be similar to the nozzle body 31 (FIG. 1a) and may define a nozzle body melt channel 507. The nozzle body 502 may have the heater 32 positioned thereon. The heater 32 may be partially or completely covered by a sleeve portion 508 of the nozzle body 502. The sleeve portion 508 may have a threaded portion 509 thereon, that is externally threaded, for mating with a threaded portion 510 that is internally threaded on the tip surrounding piece 506. The sleeve portion, 508 may be made from a thermally conductive material, such as the material of the rest of the nozzle body 31. By positioning the threaded portion 509 on the sleeve 508, the heater 32 can be positioned closer to the downstream end of the nozzle body 502, and can therefore better transfer heat to melt in the downstream end of the body 502 and in the tip 504. The optional thermocouple 36 may be positioned in the sleeve 508 to sense the temperature of melt in the nozzle 500.

The tip 504 may be similar to the tip 33 (FIG. 1a), and may define a tip melt channel 512 that has an exit 514 that is offset from the axis 27 of the gate 26.

The tip surrounding piece 506 may be similar to the tip surrounding piece 34 (FIG. 1a), and includes a shoulder 512 for mating with a shoulder 514 on the tip 504. The shoulders 512 and 514 may be tapered.

The tip surrounding piece 502 may include a first sealing surface 516, which may be similar to the sealing surface 456 on the tip surrounding piece 453 (FIG. 6), and which seals against the second sealing surface 458 on the mold component contacting piece 454 on the mold component 452.

Figure 8:
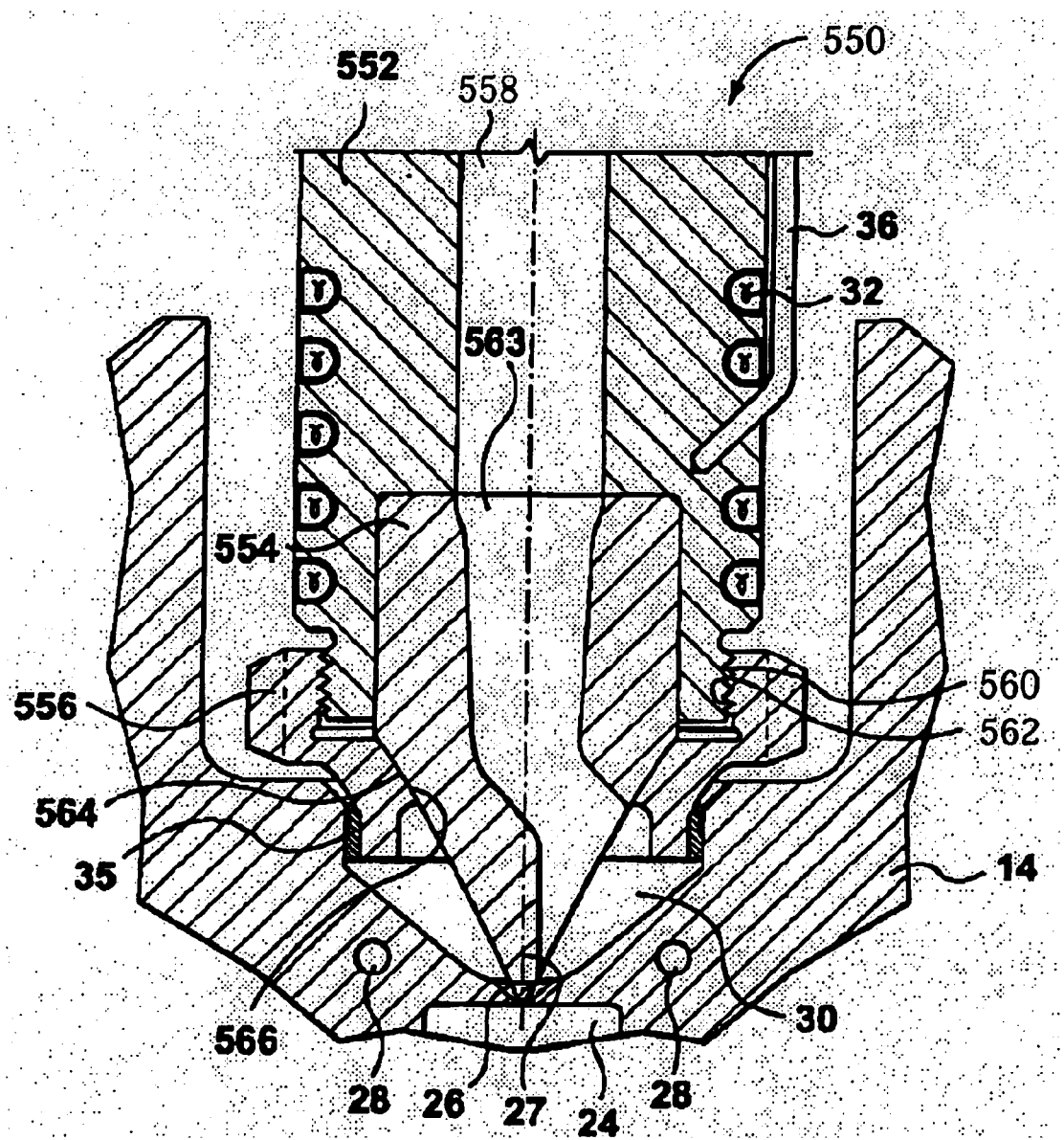
FIG. 8 is a magnified sectional view of a portion of a nozzle and a mold component in accordance with an eighth embodiment of the present invention.

Reference is made to FIG. 8, which shows a nozzle 550 in accordance with an eighth embodiment of the present invention, in combination with the mold component 14. The nozzle 550 may be similar to the nozzle 500 (FIG. 7), and includes a nozzle body 552, the heater 32, a tip 554, a tip surrounding piece 556 and the mold component contacting piece 35, and may include the optional thermocouple 36.

The nozzle body 552 may be similar to the nozzle body 502 (FIG. 7) and defines a body melt passage 558. The nozzle body 552 includes a threaded portion 560 that is externally threaded, for mating with a threaded portion 562 that is internally threaded, on the tip surrounding piece 556. The threaded portion 560 may be directly positioned on the nozzle body 552 e.g. below the heater 32, instead of being positioned on a sleeve that covers the heater 32.

The tip 554 may be similar to the tip 504 (FIG. 7) and defines a tip melt passage 563, and may include a tapered shoulder 564 which mates with a tapered shoulder 566 on the tip surrounding piece 556.

The tip surrounding piece 556 may be similar to the tip surrounding piece 502 (FIG. 7), and may retain the tip 554 in place in the nozzle body 552. The mold component contacting piece 35 may, however, be attached to the tip surrounding piece 556 instead of being attached to the mold component 14.

Figure 9:
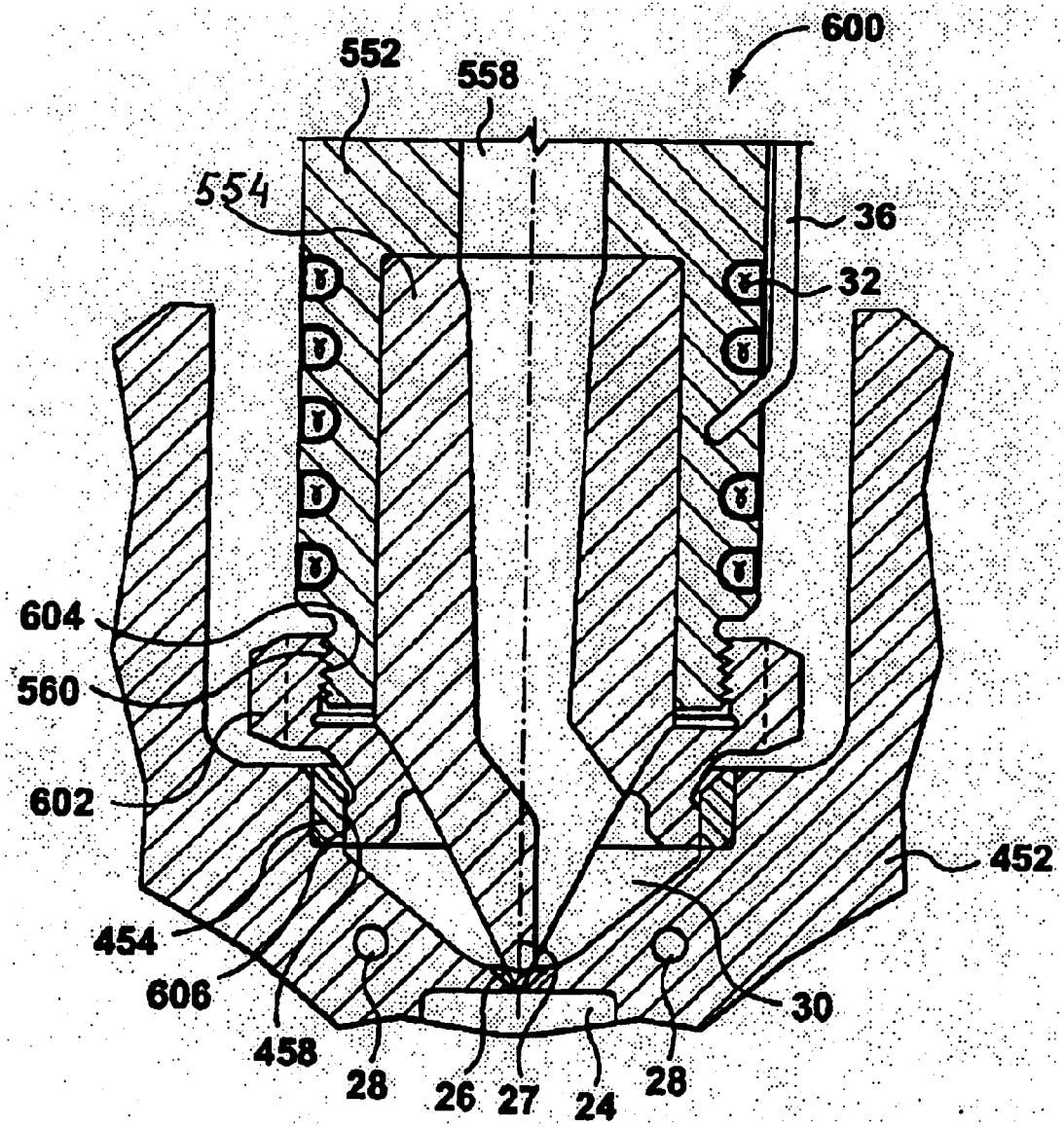
FIG. 9 is a magnified sectional view of a portion of a nozzle and a mold component in accordance with a ninth embodiment of the present invention.

Reference is made to FIG. 9, which shows a nozzle 600 in accordance with a ninth embodiment of the present invention, in combination with the mold component 452. The nozzle 600 may be similar to the nozzle 550 (FIG. 8) and may include the nozzle body 552, the heater 32, the tip 554, a tip surrounding piece 602 and the mold component contacting piece 454, and may include the optional thermocouple 36.

The tip surrounding piece 602 may be similar to the tip surrounding piece 556 (FIG. 8), and may have an internally threaded portion 604, for sealing with the externally threaded portion 560 on the nozzle body 552. The tip surrounding piece 602, however, includes a first sealing surface 606 for mating and sealing with the second sealing surface 458 on the mold component contacting piece 454.

Figure 10:
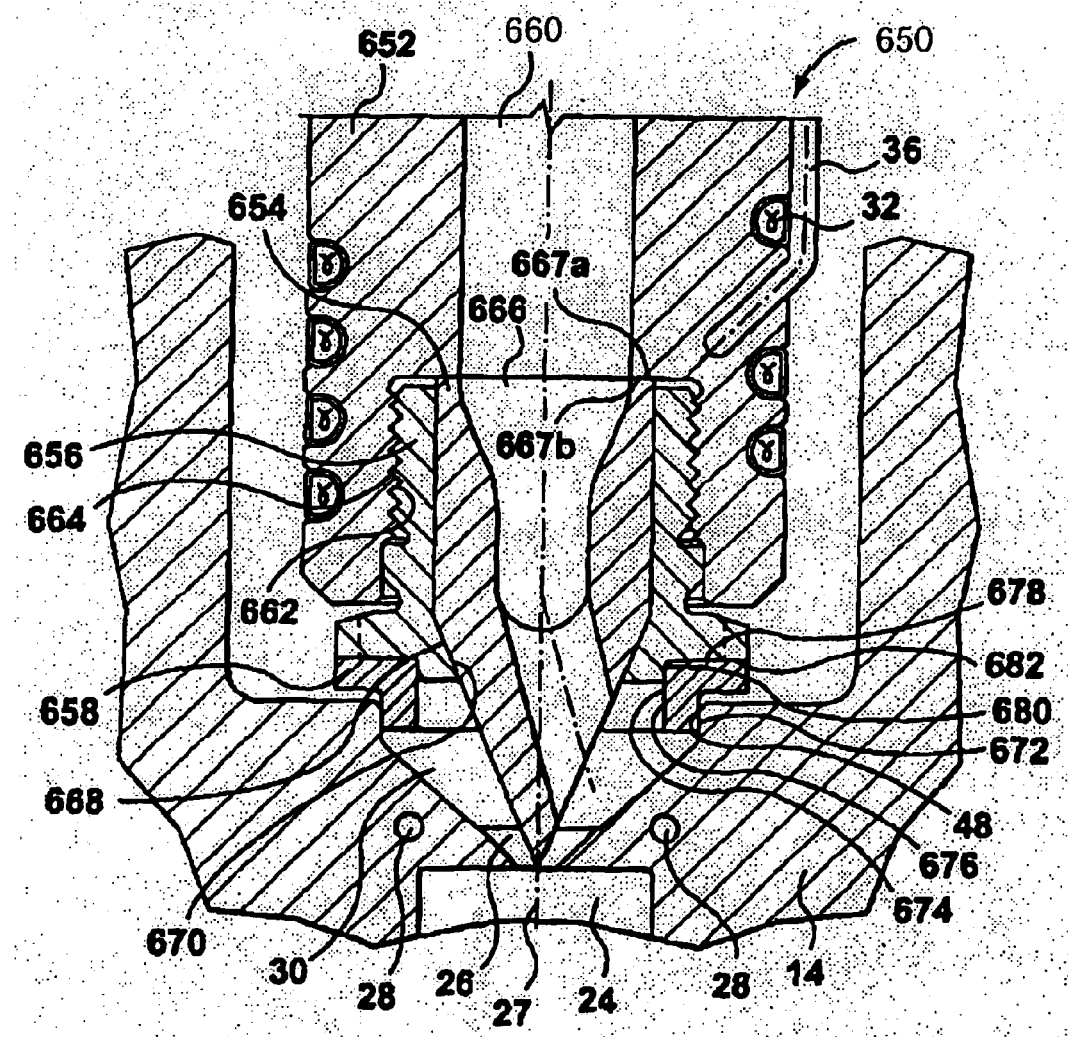
FIG. 10 is a magnified sectional view of a portion of a nozzle and a mold component in accordance with a tenth embodiment of the present invention.

Reference is made to FIG. 10, which shows a nozzle 650 in accordance with a tenth embodiment of the present invention, in combination with mold component 14. The nozzle 650 may be similar to the nozzle 600 (FIG. 9) and includes a nozzle body 652, the heater 32, a tip 654, a tip surrounding piece 656 and a mold component contacting piece 658, and may include an optional thermocouple 36.

The nozzle body 652 may be similar to the nozzle body 31 (FIG. 1) and may define a body melt passage 660. The nozzle body 652 includes a threaded portion 662 that may be internally threaded, for mating with a threaded portion 664 that may be externally threaded, on the tip surrounding piece 654. The heater 32 may be attached to the nozzle body 652 in any suitable way for heating melt in the nozzle 650.

The tip 654 may be similar to the tip 604 (FIG. 9) and defines a tip melt passage 666. The tip 654 includes a jam surface 667a, which mates with a shoulder 667b in the nozzle body 652. The tip 654 also includes a first shoulder 668 that may be tapered, which mates with a second shoulder 670 that may be tapered, on the tip surrounding piece 656, for the retention of the tip 654 in place in the nozzle body 652.

The tip surrounding piece 656 may be similar to the tip surrounding piece 606 (FIG. 9), and may retain the tip 654 in place. In the case as shown in FIG. 10, where the tip surrounding piece 656 is positioned between at least a portion of the heater 32 and the tip 654, the tip surrounding piece 656 is preferably made from a thermally conductive material so as to facilitate heat transfer between the heater 32 and melt in the tip melt passage 666.

The mold component contacting piece 658 may be L-shaped in cross-section, and may have a first sealing face 672 that seals in the bore 48 of the mold component 14, and may also align the nozzle 650 in the bore 48. The mold component contacting piece 658 may also have a second sealing face 674, which may include both a vertical portion 676 and a horizontal portion 678. The vertical and horizontal portions 676 and 678 may cooperate with a vertical sealing surface 680 and a horizontal sealing surface 682 on the tip surrounding piece 652 to inhibit melt leakage therepast.

Figure 11:
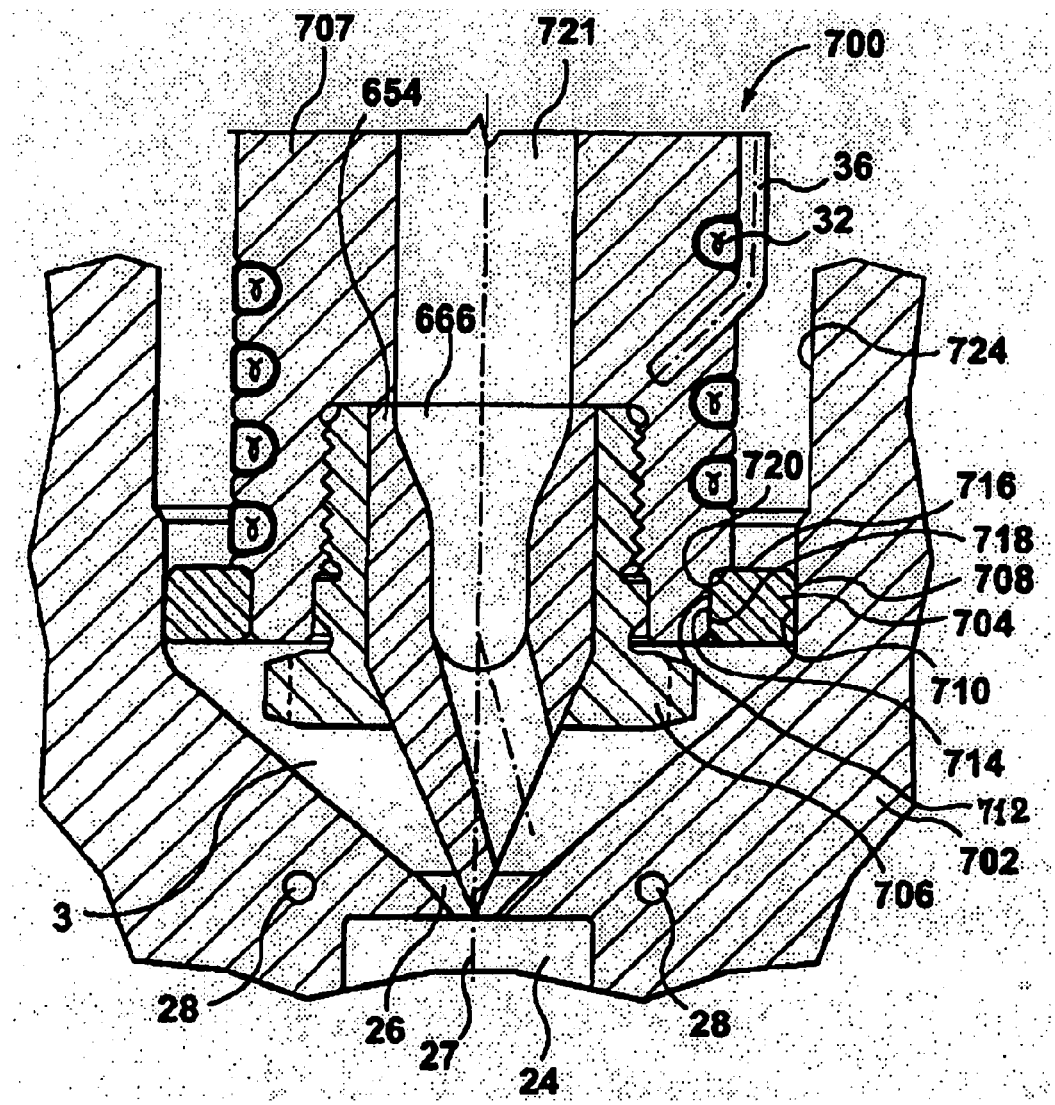
FIG. 11 is a magnified sectional view of a portion of a nozzle and a mold component in accordance with an eleventh embodiment of the present invention.

Reference is made to FIG. 11, which shows a nozzle 700 in accordance with an eleventh embodiment of the present invention, in combination with a mold component 702. Nozzle 700 may be similar to nozzle 650 (FIG. 10), and include a mold component contacting piece 704, a tip surrounding piece 706, the tip 654, and a nozzle body 707, and may include the optional thermocouple 36.

The mold component contacting piece 704 may be generally rectangular in cross-section and may have a sealing and aligning surface 708 which seals and aligns against a bore 710 in the mold component 702. The mold component contacting piece 704 may have another sealing and aligning surface 712, which may have a first portion 714 that is vertical and a second portion 716 that is horizontal. The first and second portions 714 and 716 cooperate with a mating third, optionally vertical, portion 718 and a mating fourth, optionally horizontal, portion 720 on the nozzle body 707. The nozzle body 707 may be otherwise similar to the nozzle body 652 (FIG. 10), and defines a body melt passage 721 therethrough.

The mold component 702 may be similar to the mold component 14 (FIG. 1a), except that the mold component 702 may include the bore 710 instead of bore 48. Bore 710 may have generally the same diameter as the bore which houses nozzle 700, which is shown at 724. However, the bore 710 may be machined to a close tolerance to provide an improved seal with the mold component contacting piece 704 and an improved alignment of the nozzle 700 with respect to the gate 26.

Thus, the combination of the nozzle 700 and mold component 702 may be similar to the combination of the nozzle 650 and the mold component 14 (FIG. 10), except that the seal and the alignment occur in the present embodiment between the nozzle body 707, the mold component contacting piece 704, and the mold component 702, instead of between a tip surrounding piece, a mold component contacting piece and a mold component.

Figure 12A:
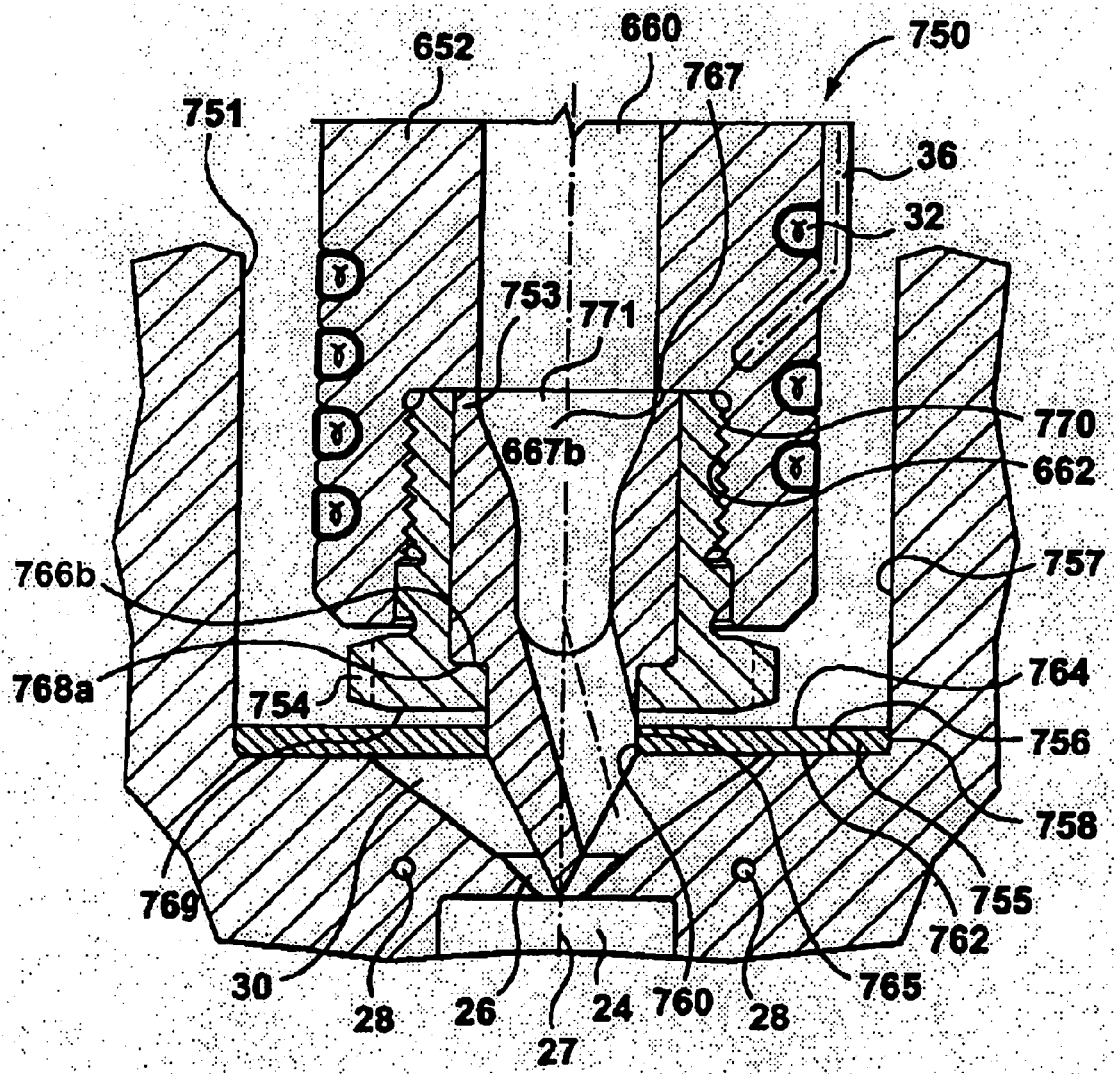
FIGS. 12a and 12b are magnified sectional views of a portion of a nozzle and a mold component in accordance with a twelfth embodiment of the present invention.
Figure 12B:
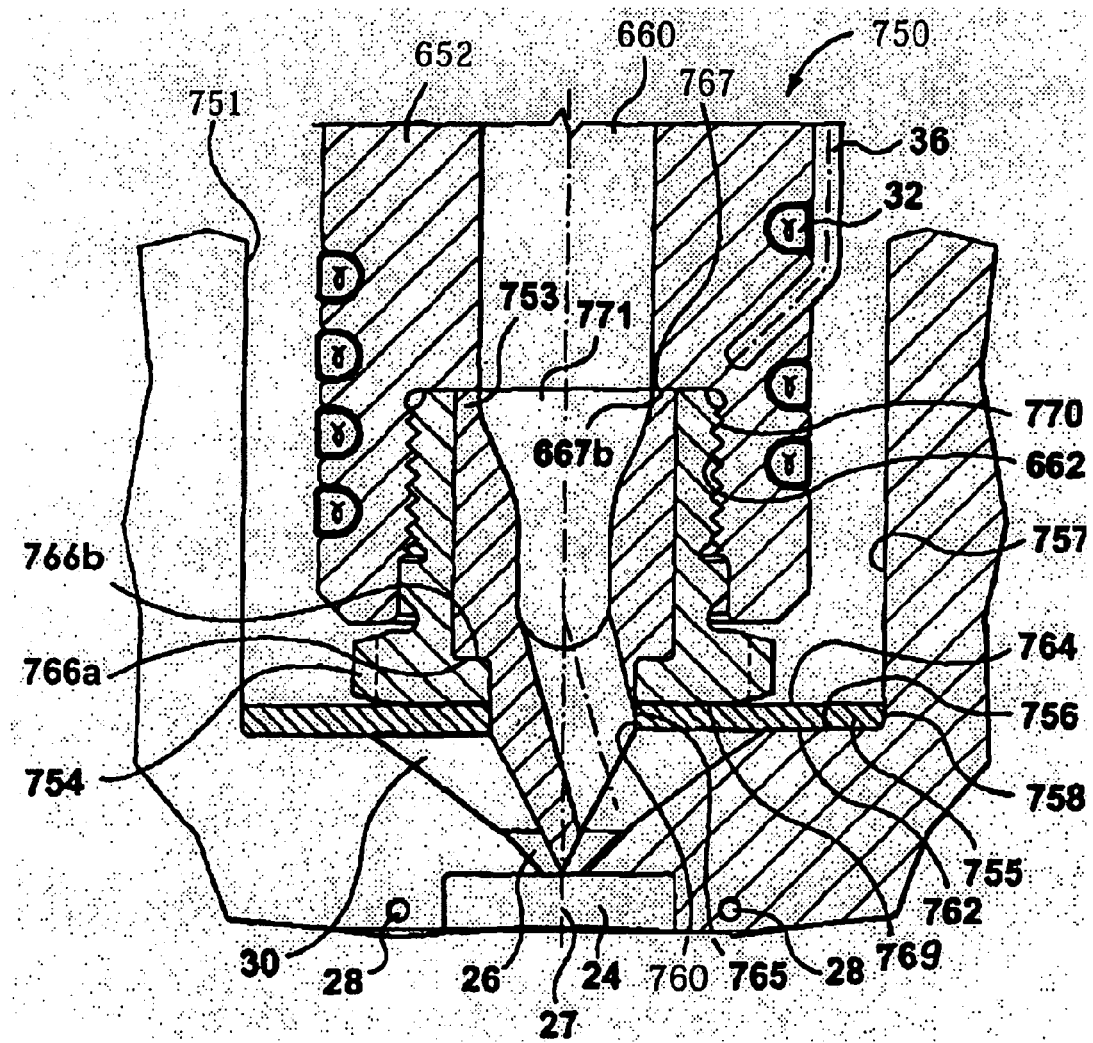

Reference is made to FIGS. 12a and 12b, which show a nozzle 750 in combination with a mold component 751, in accordance with a twelfth embodiment of the present invention. Nozzle 750 may be similar to nozzle 700 (FIG. 11), and includes the nozzle body 652, the heater 32, a tip 753, a tip surrounding piece 754 and a mold component contacting piece 755, and may include an optional thermocouple 36. The mold component contacting piece 755 may remain at a bottom shoulder 756 in a bore 757 in the mold component 751. The mold component contacting piece 755 may also be used to align the nozzle 750 relative to the gate 26.

The mold component contacting piece 755 may be generally washer-shaped, having an outer face 758, an inner face 760, a lower face 762 and an upper face 764. The outer face 758 may cooperate with the bore 757 of the mold component 751 to align the mold component contacting piece 755 relative to the gate 26. The inner face 760 in turn, cooperates with a portion of the nozzle 750, in this case, an alignment and sealing surface 765 on the tip 753, to align the nozzle 750 relative to the gate 26. The lower face 762 of the mold component contacting piece 755 may form a seal with the bottom shoulder 756 to prevent melt leakage out of the chamber 30.

The tip 753 may have a jam surface 767 for resting against the shoulder 667b in the nozzle body 652. The tip 753 may be retained in place by the cooperation between a shoulder 768a on the tip 753 and a shoulder 768b on the tip surrounding piece 754. The tip defines a tip melt passage 771 therethrough that is downstream from and in fluid communication with the body melt passage 660

The tip surrounding piece 754 has a bottom shoulder 769. In the 'cool' position, shown in FIG. 12a, there is a gap between the bottom shoulder 769 of the tip surrounding piece 754 and the upper face 764 of the mold component contacting piece 755. When the nozzle 750 is heated, it expands due to thermal expansion to a 'hot' position (FIG. 12b), whereby the lower surface 769 may contact the upper surface 764. The contact between the surfaces 769 and 764, may provided an added seal in addition to that formed by the surfaces 760 and 765.

The tip surrounding piece may have a threaded portion 770 for mating with the threaded portion 662 on the nozzle body 652.

It will be noted that in this embodiment, the mold component contacting piece 755 is not necessarily specifically attached to either of the mold component 751 or the rest of the nozzle 755.

Figure 13:
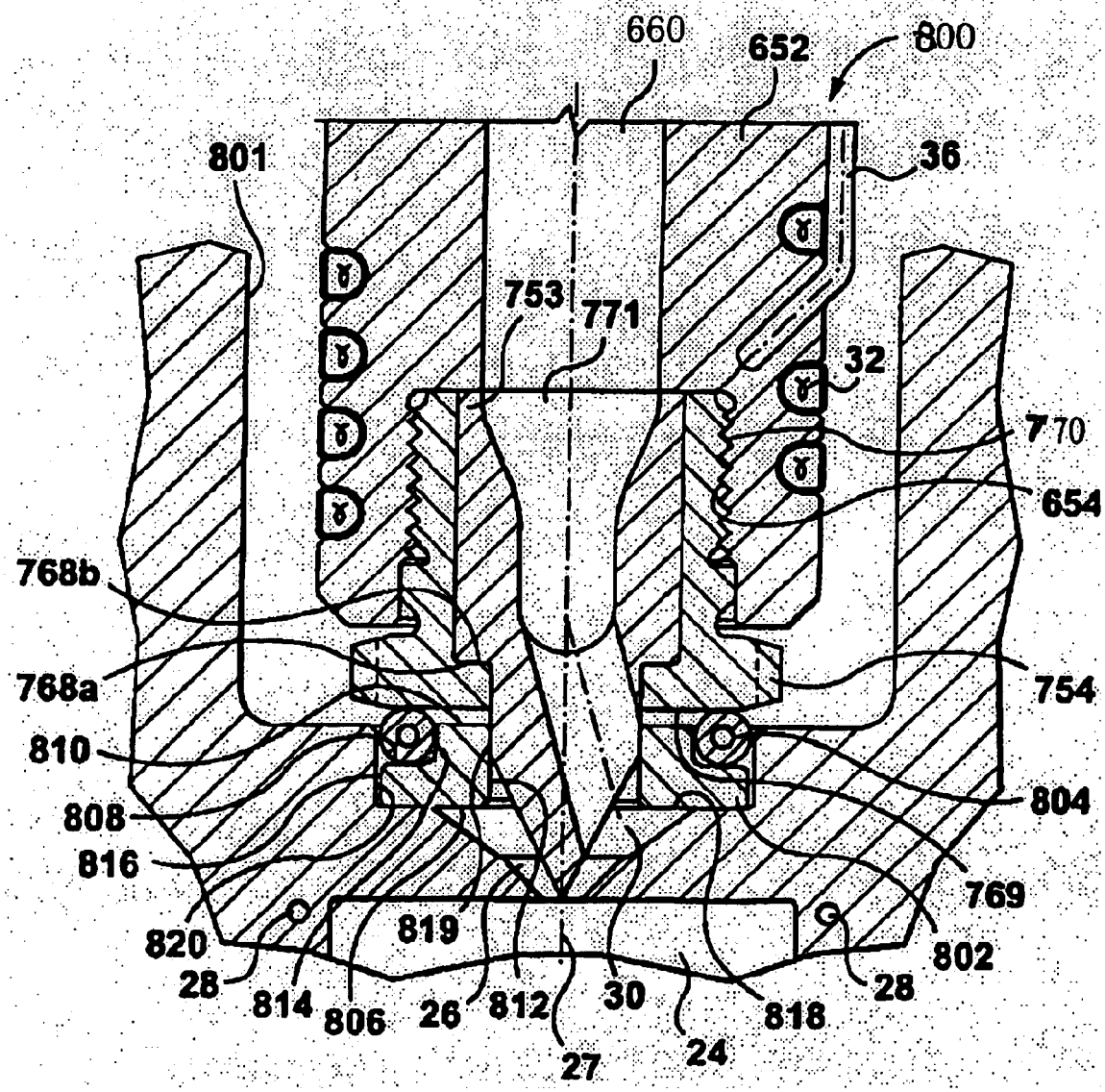
FIG. 13 is a magnified sectional view of a portion of a nozzle and a mold component in accordance with a thirteenth embodiment of the present invention.

Reference is made to FIG. 13, which shows a nozzle 800 in combination with a mold component 801, in accordance with a thirteenth embodiment of the present invention. Nozzle 800 may be similar to the nozzle 750 (FIGS. 12*a* and 12*b*), and may include the nozzle body 652, the tip 753, the tip surrounding piece 754, an alignment piece 802 and a seal piece 804, and the heater 32 and may include the optional thermocouple 36.

The alignment piece 802 may be generally L-shaped in cross-section, and may have a lower face 806, a first upper face 808, a second upper face 810, an inner face 812, a first outer face 814 and a second outer face 816. The alignment piece 802 may rest against a shoulder 818 in the mold component 801. The second outer face 816 and the bore 460 cooperate to align the alignment piece 802 relative to the gate 26. The inner face 812 cooperates with a portion of the nozzle 800, in this case, an alignment surface 819 on the tip 753 to align the nozzle 800 relative to the gate 26. A gap exists between the second upper face 810 and the bottom face 766 of the tip surrounding piece 706.

The seal piece 804 may be an O-ring that is resilient and that can seal effectively for the pressures and temperature in the general environment of an injection molding apparatus. The seal piece 804 is positioned in a pocket form by a bore 820 in the mold component 801, the first upper face 808 and the first outer face 814 and the bottom face 766 of the tip surrounding piece 754. In the 'cool' position, shown in FIG. 13, the bottom shoulder 769 of the tip surrounding piece 754 contacts and compresses seal piece 804, so that a seal is formed at all contact points between the seal piece 804 and the nozzle 800 and the mold component 801.

It will be noted that, in the embodiment shown in FIG. 13, both the alignment piece 802 and the seal piece 804 are mold component contacting pieces.

During an injection molding cycle, the nozzle 800 is heated and expands, and the gap between the bottom shoulder 769 of the tip surrounding piece 754 and the second upper face 808 of the alignment piece 802 is reduced or may be eliminated, due to the thermal expansion. The bottom shoulder 769 of the tip surrounding piece 706 further compresses the seal piece 804, thereby further strengthening the seals formed between the seal piece 804 and the nozzle 800 and the mold component 801.

Figure 14:
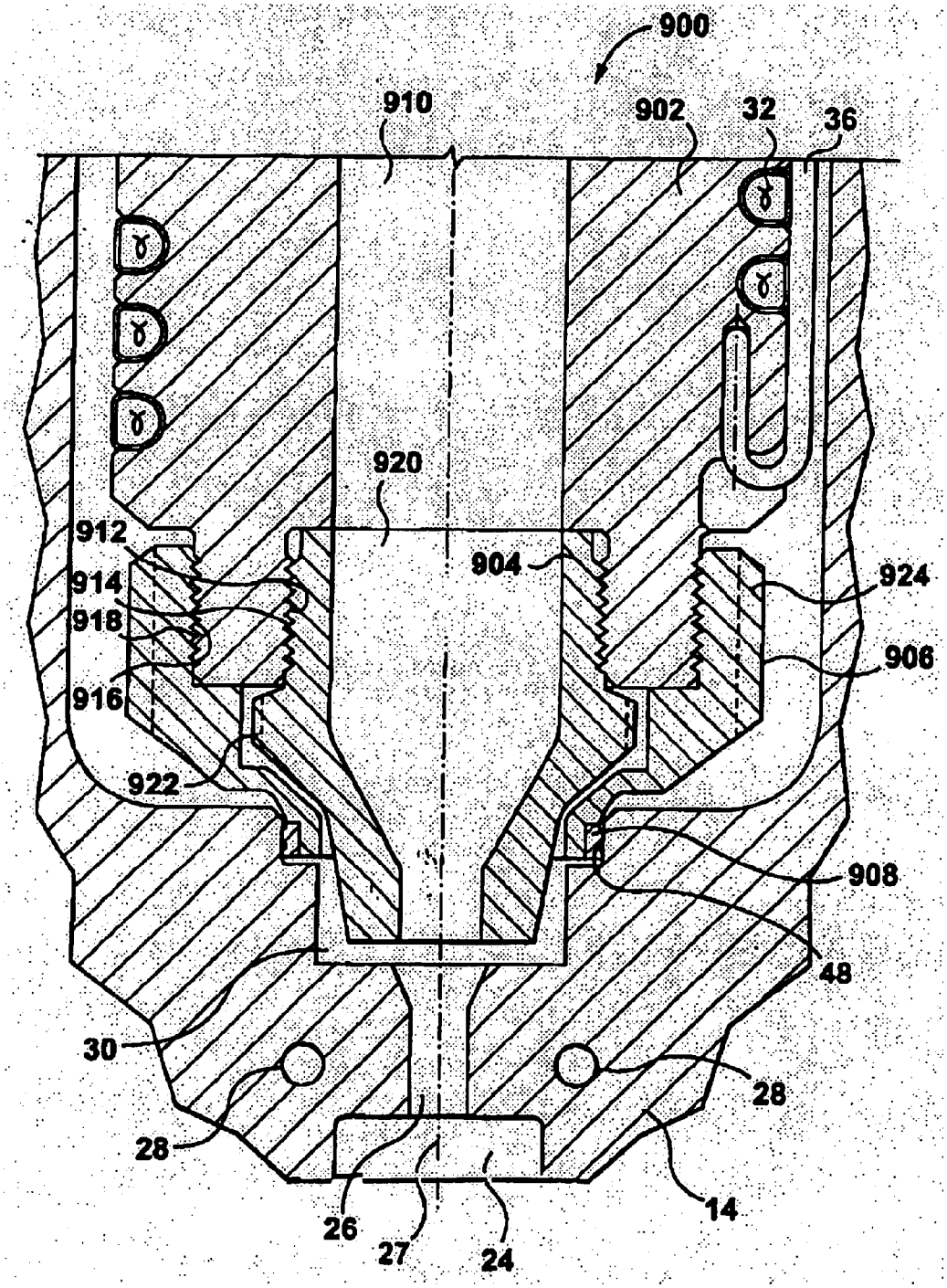
FIG. 14 is a magnified sectional view of a portion of a nozzle and a mold component in accordance with a fourteenth embodiment of the present invention.

Reference is made to FIG. 14, which shows a nozzle 900 in accordance with a fourteenth embodiment of the present invention, in combination with the mold component 14. The nozzle 900 may be similar to the nozzle 10 (FIG. 1*a*), and includes a nozzle body 902, a tip 904, a tip surrounding piece 906, and a mold component contacting piece 908, and may include the optional thermocouple 36. The nozzle body 902 may be similar to the nozzle body 31 (FIG. 1*a*) and defines a nozzle body melt passage 910 therethrough. The nozzle body 902 has a first nozzle body threaded portion 912 thereon for mating with a tip threaded portion 914 on the tip 904. The nozzle body 902 may also include a second nozzle body threaded portion 916 for mating with a corresponding tip surrounding piece threaded portion 918 on the tip surrounding piece 906. The heater 32 may be positioned on the nozzle body 902 in any suitable way for heating melt in the nozzle body melt channel 910.

The tip 904 may be similar to the tip 33 (FIG. 1*a*), and defines a tip melt passage 920 therethrough that is downstream from and in fluid communication with the nozzle body melt passage 910. The tip 904 may optionally include a tip tool engagement portion 922 for receiving a tool for the installation and removal of the tip 904 with respect to the nozzle body 902.

The tip surrounding piece 906 is not required to contact the tip 904 in the embodiment shown in FIG. 14. The tip surrounding piece 906 may include a tip surrounding piece tool engagement portion 924 for receiving a tool to facilitate the installation and removal of the tip surrounding piece 906 with respect to the nozzle body 902.

The tip surrounding piece 906 may or may not form a seal with the tip 904 for inhibiting melt leakage therebetween. Thus, melt may be permitted to exist between the tip 904 and the tip surrounding piece 906.

The mold component contacting piece 908 may be similar to the mold component contacting piece 35 (FIG. 1*a*), and may be attached to the tip surrounding piece 906 by means of a friction fit.

The mold component contacting piece 908 may align the nozzle 900 with respect to the bore 48 of the mold component 14. Alternatively, the mold component contacting piece 908 may form a seal with the bore 48 in the mold component 14 to prevent melt leakage therebetween. As a further alternative, the mold component contacting piece 908 may provide both a sealing function and an aligning function.

In the above described embodiments, the tip surrounding piece has been attached to the nozzle body by means of mating threaded portions. It is alternatively possible for the tip surrounding piece to be attached to the nozzle body in any suitable way that permits the tip surrounding piece to be removed.

In the embodiment shown in FIGS. 12*a* and 12*b*, it was disclosed that the nozzle may undergo thermal expansion, and clearance was provided between the tip surrounding piece and the mold component contacting piece to accommodate the expansion. It will be noted that thermal expansion may take place with each of the nozzles described above, and is not limited to the embodiment shown in FIGS. 12*a* and 12*b*.

A particular example of an injection molding apparatus is shown in FIG. 1. It will be appreciated that the injection molding apparatus that incorporates the nozzle tip assembly of the present invention may be any suitable type of injection molding apparatus and is not limited to the example shown.

While the above description constitutes the preferred embodiments, it will be appreciated that the present invention is susceptible to modification and change without departing from the fair meaning of the accompanying claims.

What is claimed is:

1. A nozzle for an injection molding apparatus, the injection molding apparatus having a mold component, the nozzle comprising:

a nozzle body, said nozzle body defining a nozzle body melt passage therethrough, wherein said nozzle body melt passage is adapted to receive melt from a melt source;

a heater that is thermally connected to said nozzle body for heating a melt in said nozzle body;

a thermally conductive tip, said tip defining a tip melt passage therethrough, wherein said tip melt passage is downstream from and in fluid communication with the nozzle body melt passage, and said tip melt passage is adapted to be upstream from and in fluid communication with said gate;

a thermally conductive tip surrounding piece that retains said tip in position with respect to the nozzle body and is removably attached to said nozzle body and a mold component contacting piece that is connected with respect to said nozzle body.

2. A nozzle as claimed in claim 1, wherein the thermal conductivity of the material of said mold component contacting piece is less than the thermal conductivity of the material of said tip.

3. A nozzle as claimed in claim 1, wherein the thermal conductivity of the material of the mold component contacting piece is less than the thermal conductivity of the material of said tip surrounding piece.

4. A nozzle as claimed in claim 1, wherein the thermal conductivity of the material of the tip is generally equal to the thermal conductivity of the material of the tip surrounding portion.

5. A nozzle as claimed in claim 1, wherein said tip surrounding piece has a tip surrounding piece threaded portion and said nozzle body has a nozzle body threaded portion that is adapted to mate with said tip surrounding piece threaded portion.

6. A nozzle as claimed in claim 1, wherein said tip is removably connected to said nozzle body.

7. A nozzle as claimed in claim 1, wherein said tip is positioned within a bore in said nozzle body.

8. A nozzle claimed in claim 1, wherein said mold component contacting piece is adapted to align said nozzle with respect to said gate.

9. A nozzle as claimed in claim 1, wherein a chamber is formed at least partially between said tip and an inner surface of the tip surrounding piece.

10. A nozzle as claimed in claim 1, wherein said mold component contacting piece is in contact with said tip.

11. A nozzle as claimed in claim 1, wherein said mold component contacting piece is connected to said tip surrounding piece.

12. A nozzle as claimed in claim 1, wherein said mold component contacting piece is in contact with said nozzle body.

13. A nozzle as claimed in claim 1, wherein said mold component contacting piece is adapted to align said nozzle with respect to a gate, and said nozzle further comprises a second mold component contacting piece that is adapted to inhibit leakage of melt from a chamber that is formed between said tip and said gate, when said nozzle is positioned to deliver melt to said gate of said mold component.

14. An injection molding apparatus, comprising:
   a runner component, a mold component, a gate and at least one nozzle,
   wherein said runner component defines at least one runner, and said at least one runner is adapted to receive melt from a melt source,
   wherein said nozzle includes a nozzle body, a heater, a tip, a tip surrounding piece and a mold component contacting piece,
   wherein said nozzle body defines a nozzle body melt passage therethrough, and said nozzle body melt passage is adapted to receive a melt from said at least one runner,
   wherein said heater is thermally connected to said nozzle body for heating the melt in said nozzle body,
   wherein said tip is thermally conductive and defines a tip melt passage therethrough, said tip melt passage is downstream from and in fluid communication with the nozzle body melt passage, and said tip melt passage is upstream from and in fluid communication with said gate,
   wherein said tip surrounding piece is thermally conductive, retains said tip in position with respect to said nozzle body, and is removably connected with respect to said nozzle body, and
   wherein said mold component contacting piece is connected with respect to said nozzle body.

15. An injection molding apparatus as claimed in claim 14, wherein the thermal conductivity of the material of said mold component contacting piece is less than the thermal conductivity of the material of said tip.

16. An injection molding apparatus as claimed in claim 14, wherein the thermal conductivity of the material of the mold component contacting piece is less than the thermal conductivity of the material of said tip surrounding piece.

17. An injection molding apparatus as claimed in claim 14, wherein the thermal conductivity of the material of the tip is generally equal to the thermal conductivity of the material of the tip surrounding piece.

18. An injection molding apparatus as claimed in claim 14, wherein said tip surrounding piece has a tip surrounding piece threaded portion and said nozzle body has a nozzle body threaded portion that is adapted to mate with said tip surrounding piece threaded portion.

19. A nozzle as claimed in claim 14, wherein said tip is removably connected to said nozzle body.

20. A nozzle as claimed in claim 14, wherein said tip is positioned within a bore in said nozzle body.

21. An injection molding apparatus as claimed in claim 14, wherein said mold component contacting piece aligns said nozzle with respect to said gate.

22. An injection molding apparatus as claimed in claim 14, wherein a chamber is formed at least partially between said tip and an inner surface of the tip surrounding piece.

23. An injection molding apparatus as claimed in claim 14, wherein said mold component contacting piece is in contact with said tip.

24. An injection molding apparatus as claimed in claim 14, wherein said mold component contacting piece is connected to said tip surrounding piece.

25. An injection molding apparatus as claimed in claim 14, wherein said mold component contacting piece is in contact with said nozzle body.

26. An injection molding apparatus as claimed in claim 14, wherein said mold component contacting piece is adapted to align said nozzle with respect to said gate, and said nozzle further includes a second mold component contacting piece that is adapted to inhibit leakage of melt from a chamber that is formed between said tip and said gate.

27. A nozzle for an injection molding apparatus, comprising:
   a nozzle body including a melt channel therethrough;
   a heater that is thermally coupled to the nozzle body;
   a tip including a tip melt passage therethrough, wherein the tip melt passage is in fluid communication with the nozzle melt channel;
   a thermally conductive tip surrounding piece that retains the tip in position with respect to the nozzle body and that is removably coupled to the nozzle body; and
   a mold contacting piece that is positioned between the tip surrounding piece and a mold surface, such that the tip surrounding piece is isolated from contacting the mold surface.

28. A nozzle as claimed in claim 27, wherein a chamber is formed at least partially between the tip and an inner surface of the tip surrounding piece.

29. An injection molding apparatus, comprising:
   a manifold defining at least one manifold melt channel that receives melt from a melt source;
   a mold; and
   a nozzle fluidly connecting the manifold melt channel to a gate of a mold cavity including, a nozzle body defining a nozzle melt channel, a heater thermally connected to the nozzle body, a tip defining a tip melt passage, a thermally conductive tip surrounding piece that retains the tip in position with respect to the nozzle body and is removably connected to the nozzle body, and a mold contacting piece connected with respect to the nozzle body, wherein the mold contacting piece is positioned between the tip surrounding piece and a surface of the mold, such that the tip surrounding piece is isolated from contacting the mold surface.

30. A nozzle as claimed in claim 29, wherein a chamber is formed at least partially between the tip and an inner surface of the tip surrounding piece.

31. A nozzle for delivering a melt to a mold, comprising:

a nozzle body having a melt channel;

a heater that is thermally coupled to the nozzle body;

a tip having a tip melt passage, wherein the tip melt passage is in fluid communication with the nozzle body melt channel;

a thermally conductive tip surrounding piece that retains the tip in position with respect to the nozzle body and is removably connected to said nozzle body; and a mold contacting piece that is connected with respect to said nozzle body, wherein a chamber is formed at least partially between the tip and an inner surface of the tip surrounding piece.

32. A nozzle as claimed in claim 31, wherein the tip surrounding piece is made from a material selected from the group consisting essentially of Copper, Beryllium Copper, Beryllium-free Copper, Titanium Zirconium Carbide, Aluminum, Aluminum-based alloys, Nickel-Chromium alloys, Molybdenum, H13, steel, mold steel and steel alloys.

33. An injection molding apparatus, comprising:

a manifold assembly having at least one manifold channel that is configured to receive a melt from a melt source;

a mold; and a nozzle including, a nozzle body having a melt channel, a heater thermally connected to the nozzle body, a tip defining a tip melt passage, a thermally conductive tip surrounding piece that retains the tip in position with respect to the nozzle body and is removably connected with respect to the nozzle body, and a mold contacting piece that is connected with respect to said nozzle body, wherein a chamber is formed at least partially between the tip and an inner surface of the tip surrounding piece.

34. An injection molding apparatus as claimed in claim 33, wherein the tip surrounding piece is made from a material selected from the group consisting essentially of Copper, Beryllium Copper, Beryllium-free Copper, Titanium Zirconium Carbide, Aluminum, Aluminum-based alloys, Nickel-Chromium alloys, Molybdenum, H13, steel, mold steel and steel alloys.

35. A nozzle as claimed in claim 1, wherein the nozzle tip is formed of two pieces that are made of different materials.

36. An injection molding apparatus as claimed in claim 14, wherein the nozzle tip is formed of two pieces that are made of different materials.

* * * * *

UNITED STATES PATENT AND TRADEMARK OFFICE
CERTIFICATE OF CORRECTION

PATENT NO. : 6,921,257 B2
DATED : July 26, 2005
INVENTOR(S) : George Olaru

It is certified that error appears in the above-identified patent and that said Letters Patent is hereby corrected as shown below:

Title page,
Item [54], Title, please delete "TIP ASSEMBLY HAVING AT LEAST THREE COMPONENTS FOR HOT RUNNER NOZZLE" and insert -- TIP ASSEMBLY FOR A HOT RUNNER NOZZLE --.

Signed and Sealed this

Twenty-ninth Day of November, 2005

JON W. DUDAS
*Director of the United States Patent and Trademark Office*